(12) United States Patent
Iijima et al.

(10) Patent No.: US 6,891,139 B2
(45) Date of Patent: May 10, 2005

(54) HEAT TREATMENT APPARATUS, HEAT TREATMENT METHOD, MEDIUM ON WHICH HEAT TREATMENT PROGRAM IS RECORDED, AND STEEL PRODUCT

(75) Inventors: Yoshitsugu Iijima, Kawasaki (JP); Hiroshi Mizuno, Kawasaki (JP); Hiroshi Sekine, Tokyo (JP); Noritsugu Suzuki, Tokyo (JP); Kiyoshi Nakano, Tokyo (JP); Masatoshi Sugioka, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 10/785,629

(22) Filed: Feb. 25, 2004

(65) Prior Publication Data

US 2004/0164071 A1 Aug. 26, 2004

Related U.S. Application Data

(63) Continuation of application No. PCT/JP03/04298, filed on Apr. 3, 2003.

(30) Foreign Application Priority Data

| Apr. 8, 2002 | (JP) | ......... | 2002-105408 |
| Apr. 8, 2002 | (JP) | ......... | 2002-105409 |
| Apr. 16, 2002 | (JP) | ......... | 2002-113562 |
| Mar. 5, 2003 | (JP) | ......... | 2003-058341 |

(51) Int. Cl.$^7$ .............................. H05B 6/06
(52) U.S. Cl. .................. 219/667; 219/655; 148/520
(58) Field of Search ................... 219/667, 655, 219/650, 635, 636, 637, 683, 645, 663, 664, 665, 653, 670–672, 633, 647, 603; 266/90, 122, 129, 103, 234; 148/520, 526, 566–567, 909, 570–575, 578–579; 432/8

(56) References Cited

U.S. PATENT DOCUMENTS

| 4,307,276 | A | | 12/1981 | Kurata et al. |
| 4,484,048 | A | * | 11/1984 | Travers et al. ............... 219/645 |
| 5,487,795 | A | * | 1/1996 | Kim et al. ................... 148/520 |
| 5,770,838 | A | * | 6/1998 | Rohrbaugh et al. ......... 219/645 |
| 6,180,933 | B1 | * | 1/2001 | Demidovitch et al. ...... 219/655 |
| 6,285,015 | B1 | * | 9/2001 | Doizaki et al. ............. 219/645 |

FOREIGN PATENT DOCUMENTS

| JP | 56-41328 | 4/1981 |
| JP | 62-238328 | 10/1987 |
| JP | 63-38531 | 2/1988 |
| JP | 9-170021 | 6/1997 |

OTHER PUBLICATIONS

JIS Hand Book Tekko, 1$^{st}$ edition, 1990, p. 1273.

* cited by examiner

Primary Examiner—Quang T Van
(74) Attorney, Agent, or Firm—Nixon & Vanderhye P.C.

(57) ABSTRACT

A heat treatment apparatus includes a plurality of induction heating devices which heat a steel product, a correctional device which corrects the steel product, a computing device which computes supply predetermined electric power which is supplied to the induction heating device, on the basis of a size of the steel product, a conveying speed of the steel product, a heating target temperature of the steel product, and a predetermined temperature of the steel product at the previous stage of the induction heating devices, and a power supply unit which supplies the supply predetermined electric power computed by the computing device to the induction heating devices, and the computing device which computes electric power for uniform heating processing on the steel product or electric power for surface layer heating processing on the steel product.

46 Claims, 12 Drawing Sheets

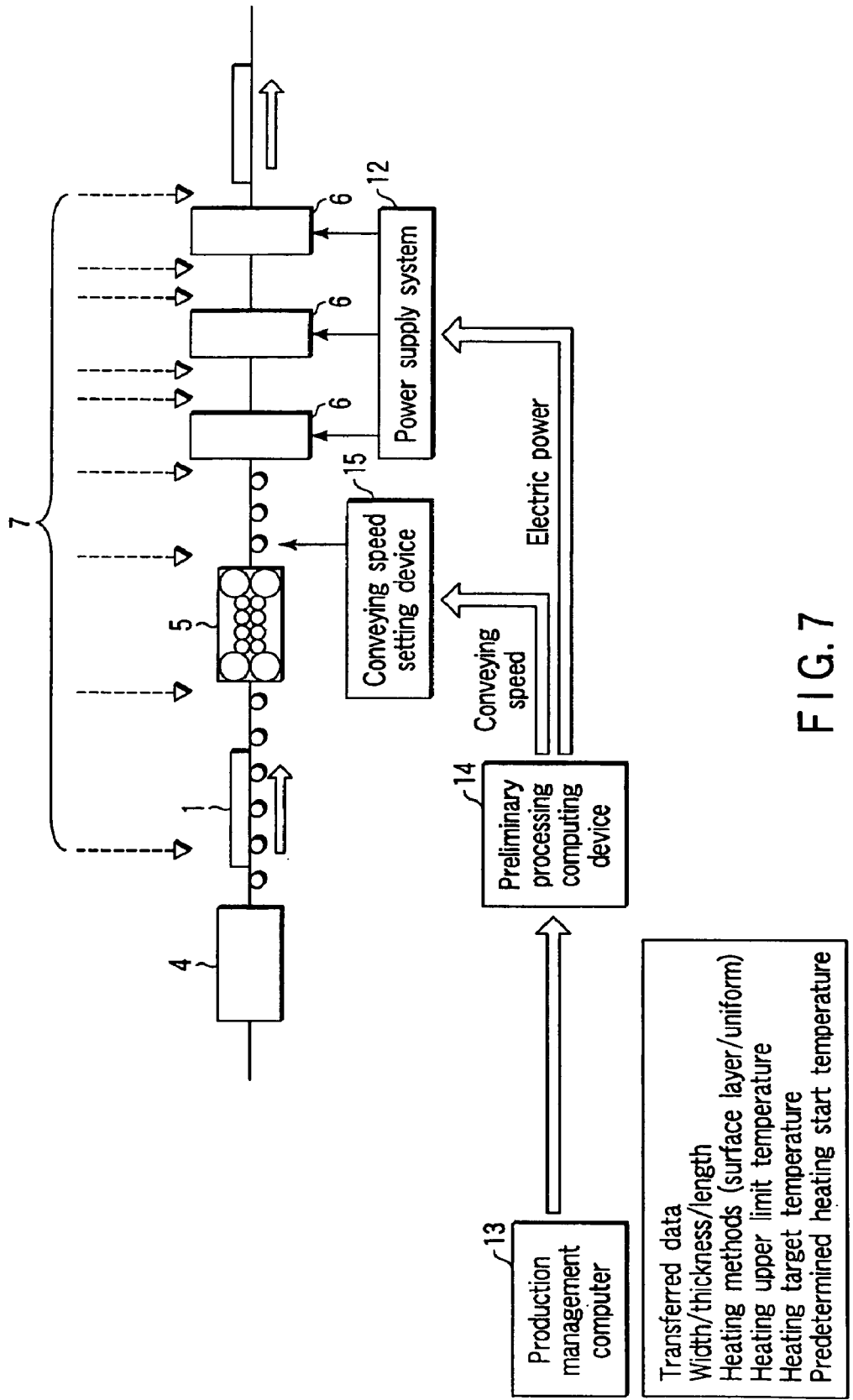
F I G. 7

| Thickness (mm) | Width (mm) | | 1000 | | | | 2000 | | | | 3000 | | | |
|---|---|---|---|---|---|---|---|---|---|---|---|---|---|---|
| | Length (m) | The number of passes | Speed 1 | Speed 2 | Speed 3 | The number of passes | Speed 1 | Speed 2 | Speed 3 | The number of passes | Speed 1 | Speed 2 | Speed 3 |
| 20 | 15 | 1 | 120 | – | – | 1 | 120 | – | – | 1 | 100 | – | – |
| | 25 | 1 | 120 | – | – | 1 | 120 | – | – | 1 | 90 | – | – |
| | 35 | 1 | 110 | – | – | 1 | 110 | – | – | 1 | 80 | – | – |
| 30 | 15 | 1 | 70 | – | – | 3 | 80 | 100 | 120 | 3 | 60 | 80 | 100 |
| | 25 | 1 | 60 | – | – | 3 | 60 | 80 | 100 | 3 | 50 | 70 | 80 |
| | 35 | 1 | 50 | – | – | 3 | 50 | 60 | 70 | 3 | 40 | 60 | 60 |
| 40 | 15 | 3 | 60 | 80 | 100 | 3 | 50 | 60 | 80 | 3 | 30 | 40 | 60 |
| | 25 | 3 | 50 | 70 | 80 | 3 | 40 | 50 | 60 | 3 | 20 | 30 | 40 |
| | 35 | 3 | 40 | 50 | 60 | 3 | 30 | 40 | 50 | 3 | 20 | 30 | 30 |

Unit of speed (m/minute)

FIG. 8

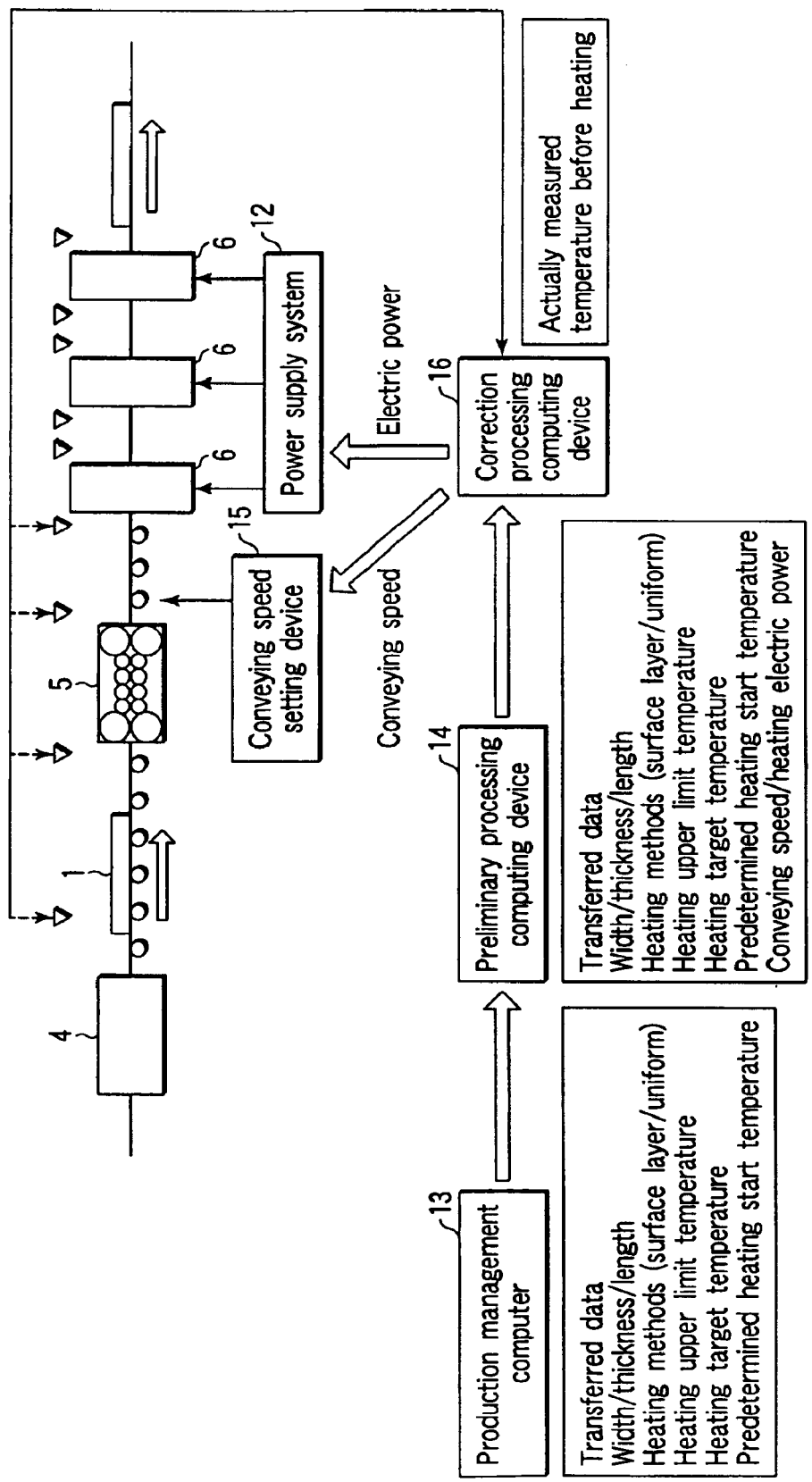
F I G. 13

HEAT TREATMENT APPARATUS, HEAT TREATMENT METHOD, MEDIUM ON WHICH HEAT TREATMENT PROGRAM IS RECORDED, AND STEEL PRODUCT

CROSS-REFERENCE TO RELATED APPLICATIONS

This is a Continuation Application of PCT Application No. PCT/JP03/04298, filed Apr. 3, 2003, which was not published under PCT Article 21(2) in English.

This application is based upon and claims the benefit of priority from prior Japanese Patent Applications No. 2002-105408, filed Apr. 8, 2002; No. 2002-105409, filed Apr. 8, 2002; No. 2002-113562, filed Apr. 16, 2002; and No. 2003-058341, filed Mar. 5, 2003, the entire contents of all of which are incorporated herein by reference.

BACKGROUND OF THE INVENTION

1. Field of the Invention

The present invention relates to a technique in which a steel product is heat-treated by using an induction heating device.

2. Description of the Related Art

In the process of steels, various heat treatments, such as quenching, tempering, annealing, or the like, are carried out in order to manufacture an even stronger and tougher steel product due to the characteristics, such as hardness, toughness, and the like, of the steel product which will be a product being improved. These heat treatments are generally divided into a process of heating and a process of cooling. In the heating process thereamong, a transformation temperature corresponding to a component of a steel product is a standard. For example, heating must be carried out so that a temperature of a steel product is higher than the transformation temperature in the case of quenching, and heating must be carried out so that a temperature of the steel product is lower than the transformation temperature in the cases of tempering and annealing.

Therefore, it is necessary to high-accurately heat in accordance with a purpose of a heat treatment. Further, in order to suppress dispersion in the quality in the same member, it is necessary to uniformly heat over the inside and outside of the steel product. This heat treatment method is called a uniform heating.

Further, because a steel product which is generally manufactured and to which the heat treatments of quenching and tempering are applied, is cooled from, mainly, the surface thereof, the hardness in the surface tends to be higher than that of the inside. Such a steel product having a hardness distribution in the thickness direction is irresistible for a corrosive environment, and it has been clear that, if such a steel product is used in the ocean, or for a pipeline of petroleum or natural gas, and the like, a stress corrosion cracking easily arises.

Accordingly, there are cases of carrying out processing in which a hardness difference between the surface layer portion and the inside is made small due to the surface layer portion being heated at a high temperature. This heat treatment method is called a surface layer heating.

Conventionally, as a heating method for achieving these heating conditions, for example, a heat treatment technique which is disclosed in Japanese Patent Application Laid-Open (JP-A) No. 9-170021, and which uses an induction heating device, is known.

In the disclosed art, an induction heating method has been proposed in which a semi-heating step of induction-heating at the same frequency as in the induction heating at a heating step and with inputted electric power being made lower than that at the heating step, is provided between the heating step in which a temperature of the steel product is risen in an induction heater, and a soaking step of heating with a frequency being made higher than that of the heating step and with inputted electric power being made lower.

However, it is not efficient because several ten minutes are required as a heating time in the art disclosed in JP-A No. 9-170021. Further, because a frequency of the induction heating device is changed on the way of heating of a steel product, it is necessary to equip a mechanism of switching a frequency. Accordingly, the apparatus is made high-priced, and the structure of the apparatus is further made complex. Further, in an inputted electric power calculation for heating a steel product, an induced current distribution at the inside of a steel product, releasing of heat by the atmosphere, an efficiency of a heating device, specific heat of a steel product, and the like which are the factors required for achieving an high-accurate temperature control, are not considered.

BRIEF SUMMARY OF THE INVENTION

An object of the present invention is to provide a heat treatment apparatus, a heat treatment method, a medium on which a heat treatment program is recorded, and a steel product in which a heat treatment, which is such that a surface temperature and an internal temperature of a steel product are in high-accurate agreement with targets, and the steel product has target characteristics, can be carried out.

A heat treatment apparatus in the present invention has: a plurality of induction heating devices which heat a steel product; a correctional device for correcting the steel product; a computing device which computes supply predetermined electric power which is supplied to the induction heating devices, on the basis of a size of the steel product, a conveying speed of the steel product, heating target temperatures of the steel product, and a predetermined temperature of the steel product at the previous stage of the induction heating devices; and a power supply unit which supplies the supply predetermined electric power computed by the computing device to the induction heating devices, wherein the computing device computes supply predetermined electric power to be supplied to the induction heating devices in order to heat the steel product so that the steel product has a surface temperature equal to or lower than a first target temperature while being heated, and a difference between a second target temperature and a temperature which the steel product has at a predetermined position in the thickness direction of the steel product when the heating is completed falls within a predetermined range, or so that the steel product has a surface equal to or higher than a third target temperature while being heated and has a temperature equal to or lower than a fourth target temperature at the predetermined position in the thickness direction of the steel product when the heating is completed.

Namely, the heat treatment apparatus can shorten a heating time due to the steel product being heated by the induction heating device. Further, the heat treatment apparatus has the computing device calculating electric power of the induction heating devices, which is such that a temperature distribution at the inside of the steel product becomes a target temperature distribution. Accordingly, the structure of the apparatus is made simple, and can be structured at low cost. Further, in accordance with this structure, the uniform heating and the surface layer heating serving as the purposes can be high-accurately achieved.

BRIEF DESCRIPTION OF THE SEVERAL VIEWS OF THE DRAWING

FIG. 7 is a block diagram of a system achieving a preliminary processing method;

FIG. 8 is a view showing a correspondence table of the size, the conveying speeds, and the number of passes of steel products;

FIG. 13 is a diagram showing a structure of a system relating to a combination processing method;

DETAILED DESCRIPTION OF THE INVENTION

Generally, a steel product is heated in a heating furnace, and the temperature thereof is risen to about 1200° C. Thereafter, the steel product is rolled so as to be predetermined thickness and width by, usually, a plurality of rolling mills. After rolling, the steel product which are still at 800° C. through 1000° C. is forcibly cooled by water, or is self-cooled by the atmosphere. In accordance with this processing, the steel product is quenched. In particular, it has been clear that the strength and the toughness of a steel product can be strengthened due to quick cooling by an accelerated cooling device being carried out after rolling.

Thereafter, as needed, a heat treatment such as tempering, annealing, or the like is carried out again in a gas furnace. The steel product to which the heat treatment is carried out is cut and shipped.

Figure 1:
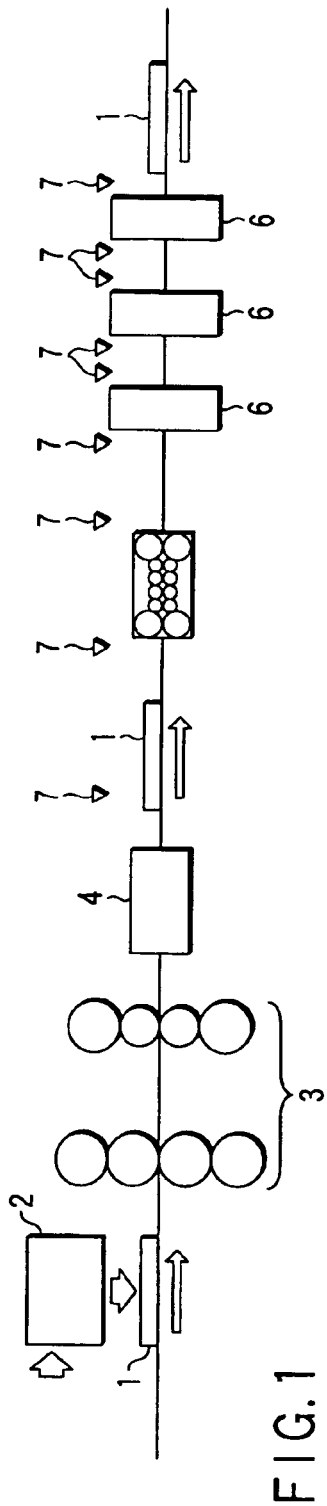
FIG. 1 is a side view showing a schematic structure of a manufacturing line of a steel product to which the present invention is applied.

FIG. 1 is a side view showing a schematic structure of a manufacturing line of a steel product to which the present invention is applied. The manufacturing line is structured from a heating furnace 2 in which a steel product 1 is heated, a rolling mill 3 carrying out rough rolling/finish rolling, an accelerated cooling device 4, a correctional device 5, induction heating devices 6, and temperature detectors 7 measuring a temperature of the steel product 1.

In this steel product manufacturing line, after the rolling process and the cooling process, a camber and a curvature of the steel product 1 are corrected by using the correctional device 5, and thereafter, the tempering processing is carried out by the induction heating devices 6 provided on the line.

In this steel product manufacturing line, the heat treatment is carried out by using the induction heating devices 6, in place of the heat treatment by gas furnaces. Accordingly, because the tempering processing can be carried out after quenching processing in-line, the efficiency thereof can be markedly improved. Further, due to the induction heating devices 6 being used, an accuracy of a heating temperature can be improved as compared with the case of using gas furnaces. Accordingly, it is also possible to high-accurately control the temperature distribution in the thickness direction.

In particular, due to quick cooling by the accelerated cooling device 4 being carried out after rolling, and immediately thereafter, due to a heat treatment by the induction heating device 6 being carried out, a steel product whose strength and toughness are strengthened can be manufactured.

The induction heating devices 6 must have the ability to be able to heat the steel product 1 to a predetermined temperature. However, it is necessary to suppress the equipment cost. Therefore, due to the steel product 1 being heated by being reciprocated through the induction heating devices 6 plural times, heating can be carried out by a fewer number of the induction heating devices 6. In this case, it is necessary to improve a temperature controlling accuracy of the steel product 1 while avoiding deteriorating the efficiency of the steel product manufacturing line including rolling. Accordingly, it is necessary to appropriately select the number of reciprocations (the number of passes) and a conveying speed.

Accordingly, when a heat treatment is carried out by using the induction heating devices, the following points are important.

<1> Time and the electric energy required for heating processing are suppressed to a minimum.

<2> During heating processing and at the time of completing heating processing, heating is carried out such that a temperature distribution in the thickness direction of the steel product is made to be a desired temperature distribution.

<3> A conveying speed of the steel product and electric powers of the induction heating devices for achieving the heat treatments of the above-described <1> and <2> are determined.

Accordingly, a heat treatment apparatus according to embodiments of the present invention has the following functions.

(1) Setting Calculating Function

The conveying speed and electric power for heating the steel product 1 are determined by one processing method among the following three processing methods.

<1> Preliminary Processing Method

In advance, a conveying speed and the number of passes are determined in accordance with a predetermined heating start temperature and a heating target temperature of the steel product 1, and electric power required for the heating is calculated on the basis of the values thereof. The steel product 1 is heated by the electric power which is set by the induction heating device 6 while being conveyed at the determined conveying speed.

<2> Correction Processing Method

A temperature before starting of heating the steel product 1 is actually measured, and electric power required for heating is calculated on the basis of the actually measured temperature before starting of heating and the conveying speed. In this calculation, desired electric power is determined while the conveying speed is being corrected as needed.

<3> Combination Method

This is a method in which the above-described <1> and <2> are combined. A temperature before starting of heating the steel product 1 is actually measured. Further, when the actually measured temperature is close to the predetermined heating start temperature, heating is carried out by the conveying speed and the electric power which were calculated by the <1> Preliminary processing method. When the actually measured temperature is different from the predetermined temperature, heating is carried out by the conveying speed and the electric power which were determined by the <2> Correction processing method.

(2) Tracking Processing Function

A steel product is divided into imaginary portions in the longitudinal direction, and the heating electric power which was calculated by the setting calculating function is set for each imaginary portion, and is outputted by an power supply system in accordance with conveyance of the steel product.

(3) Heating electric power correcting function A temperature of the steel product 1 is measured by the temperature detectors 7 provided before and behind the induction heating device 6. The heating electric power is corrected in accordance with the actually measured temperature. A FF (feedforward) control and a FB (feedback) control are provided.

(4) Model Learning Function

A heat transfer model of a steel product for determining heating electric power, an efficiency estimating model by induction heating, a temperature falling model at a correctional device, or the like are corrected in accordance with the measured temperature.

Hereinafter, these functions will be described.

I. Setting Calculating Function

First, a method for calculating electric power when the heating start temperature and the conveying speed of the steel product 1 are provided, will be described.

Figure 2:
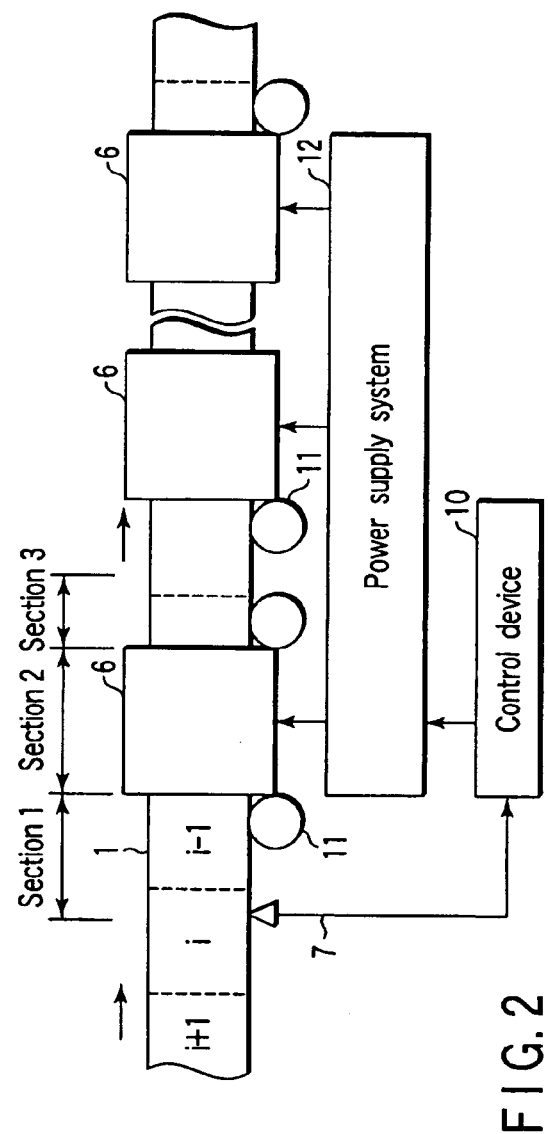
FIG. 2 is a side view showing a schematic structure of a heat treatment apparatus according to a first embodiment of the present invention.

FIG. 2 is a side view showing a schematic structure of a heat treatment apparatus according to a first embodiment of the present invention.

The steel product 1 is heated while being moved in the induction heating device 6. The temperature detectors 7 detecting a temperature of the steel product 1 are provided at the entrances of the respective induction heating devices 6. A temperature signal obtained at the above-described temperature detector 7 is inputted to a control device 10. The control device 10 calculates electric power which will be supplied to the induction heating device 6 on the basis of the temperature or the predetermined temperature for heating start, and the conveying speed of the steel product 1, and outputs the value to a power supply system 12. The power supply system 12 controls the output of the induction heating device 6 such that the supplied electric power is made to be the value which was provided from the induction heating device 6.

When the steel product 1 is heated by the induction heating device 6, because the induced current flows intensively on the surface of the steel product, the surface is mainly heated. Further, the inside of the steel product is heated by, mainly, heat transfer from the surface.

Accordingly, an induced current distribution at the inside of the steel product when heating is carried out by the induction heating device 6 is determined. The current distribution of the inside of the steel product is expressed by a depth of penetration. The depth of penetration differs in accordance with a frequency and a relative permeability, and is expressed by formula (1).

$$\delta = 5.03 \times \sqrt{R/(\mu \times fx)}/100 \qquad (1)$$

wherein, $\delta$: depth of penetration, R: specific resistance, $\mu$: relative permeability, fx: frequency.

When the depth of penetration $\delta$ is large, induced current flows up to the inside of the steel product. When the depth of penetration $\delta$ is small, because induced current concentrates on the surface, heating as well concentrates on the surface, and the inside of the steel product is heated by heat conduction from the surface. Accordingly, even if the same electric power is inputted, a heating temperature of the surface varies if the depth of penetration differs. Then, the depth of penetration is determined on the basis of formula (1), and a current density distribution at the inside of the steel product is determined. In accordance with the current density distribution, heating electric power to the induction heating device 6 is determined.

Generally, the relationship between a distance z from the surface of the steel product and induced-current I(z) at that position is expressed by formula (2). $\alpha$ is a constant.

$$I(z) = \alpha \exp(-z/\delta) \qquad (2)$$

Therefore, a ratio of electric power consumption at the position having a distance z from the surface of the steel product is expressed by formula (3).

$$E_0(z) = I(z)^2 / \int I(z)^2 \qquad (3)$$

Namely, it can be regarded that formula (3) expresses the electric power distribution at the time of induction heating.

Next, a temperature change of the steel product during heating by using the induction heating device 6 is expressed by numerical formulas. Formulas (4) through (6) are obtained from difference equations of heat conduction.

$$\frac{x_{i,j+1} - x_{i,j}}{dt} = K \frac{1}{2} \left\{ \frac{x_{i+1,j+1} - 2x_{i,j+1} + x_{i-1,j+1}}{h^2} + \frac{x_{i+1,j} - 2x_{i,j} + x_{i-1,j}}{h^2} \right\} + Q_1 \qquad (4)$$

$$K = \lambda/(c_p \times \rho) \qquad (5)$$

$$h = t/nb \qquad (6)$$

wherein, nb: divided number in the thickness direction of the steel product, t: thickness of the steel product, $x_{i,j}$:

temperature in a thickness direction i at a time j ($1 \leq i \leq nb$), $c_p$: specific heat, h: divided width in the thickness direction, dt: sampling period, $Q_1$: amount of heat added from the outside to the steel product, $\lambda$: thermal conductivity, and $\rho$: density When formula (4) through (6) are rewritten, a temperature difference equation in which the steel product is divided into three in the thickness direction becomes formula (7).

$$\begin{bmatrix} \frac{K}{h^2}+\frac{1}{dt} & -\frac{K}{2h^2} & 0 \\ -\frac{K}{2h^2} & \frac{K}{h^2}+\frac{1}{dt} & -\frac{K}{2h^2} \\ 0 & -\frac{K}{2h^2} & \frac{K}{h^2}+\frac{1}{dt} \end{bmatrix} \begin{bmatrix} x_{3,j+1} \\ x_{2,j+1} \\ x_{1,j+1} \end{bmatrix} = \tag{7}$$

$$\begin{bmatrix} \frac{1}{dt}-\frac{K}{h^2} & \frac{K}{2h^2} & 0 \\ \frac{K}{2h^2} & \frac{1}{dt}-\frac{K}{h^2} & \frac{K}{2h^2} \\ 0 & \frac{K}{2h^2} & \frac{1}{dt}-\frac{K}{h^2} \end{bmatrix} \begin{bmatrix} x_{3,j} \\ x_{2,j} \\ x_{1,j} \end{bmatrix} + Q_1$$

$Q_1$ of formula (4) is formed from heat transfer with the atmosphere which is the boundary condition and amount of heat supplied from the heating device, and is expressed by formula (8).

$$Q_1 = Q + \beta B_0 u_b \tag{8}$$

$$Q = \begin{bmatrix} \frac{1}{h}\frac{\varepsilon\sigma}{c_p\rho}(x_{3,j}^4 - T_a^4) + \lambda(x_{3,j} - T_a) \\ 0 \\ \frac{1}{h}\frac{\varepsilon\sigma}{c_p\rho}(x_{1,j}^4 - T_a^4) + \lambda(x_{1,j} - T_a) \end{bmatrix} \tag{9}$$

$$B_0 = \frac{1}{c_p\rho}\begin{bmatrix} E(3) \\ E(2) \\ E(1) \end{bmatrix} \tag{10}$$

wherein, $u_b$: amount of heat supplied by heating device, $\varepsilon$: emissivity, $\sigma$: Stefan-Boltzmann constant, $\rho$: density, $c_p$: specific heat, $\beta$: heating efficiency, $T_a$: atmospheric temperature.

Note that E(i) (i=1, 3) is a numerical formula in which formula (3) is expressed by the difference equation.

Here, formula (9) is linearized with respect to $X_{i,j}$. Given that the temperature of the steel product is $x_0$, the terms of $x_{i,j}^4$ in formula (9) are approximately linearized, centering around $x_0$ by using up to the first-order term of the tailored expansion. The tailored expansion up to the first-order terms is expressed by formula (11).

$$f(x) = \frac{f(x_0)}{0!}(x-x_0)^0 + \frac{f^{(1)}(x_0)}{1!}(x-x_0)^1 \tag{11}$$

wherein, $f^{(1)}(x_o)$; the linear differential of f(x).
Formula (12) is obtained by using formula (11).

$$x_{i,j}^4 = \frac{x_0^4}{1}(x-x_0) + \frac{-3x_0^4}{1}(x-x_0) \tag{12}$$

$$x_{i,j}^4 = -3x_0^4 + 4x_0^3 x_{i,j} \tag{13}$$

Accordingly, formula (9) becomes formula (14).

$$Q = -\begin{bmatrix} \left(\frac{1}{h}\frac{1}{c_p\rho}4\sigma\varepsilon x_0^3 + \lambda\right)x_{3,j} \\ 0 \\ \left(\frac{1}{h}\frac{1}{c_p\rho}4\sigma\varepsilon x_0^3 + \lambda\right)x_{1,j} \end{bmatrix} - \tag{14}$$

$$\begin{bmatrix} \frac{1}{h}\frac{1}{c_p\rho}\sigma\varepsilon(-3x_0^4 - T_a^4) - \lambda T_a \\ 0 \\ \frac{1}{h}\frac{1}{c_p\rho}\sigma\varepsilon(-3x_0^4 - T_a^4) - \lambda T_a \end{bmatrix}$$

Formula (15) is obtained due to formula (7) being arranged by using formula (14).

$$E\begin{bmatrix} x_{3,j+1} \\ x_{2,j+1} \\ x_{1,j+1} \end{bmatrix} = A_0\begin{bmatrix} x_{3,j} \\ x_{2,j} \\ x_{1,j} \end{bmatrix} + Q + \beta B_0 u_b \tag{15}$$

wherein, $$E = \begin{bmatrix} \frac{K}{h^2}+\frac{1}{dt} & -\frac{K}{2h^2} & 0 \\ -\frac{K}{2h^2} & \frac{K}{h^2}+\frac{1}{dt} & -\frac{K}{2h^2} \\ 0 & -\frac{K}{2h^2} & \frac{K}{h^2}+\frac{1}{dt} \end{bmatrix} \tag{16}$$

$$A_0 = \tag{17}$$

$$\begin{bmatrix} \frac{1}{dt}-\frac{K}{h^2}-\left(\frac{1}{h}\frac{1}{c_p\rho}4\sigma\varepsilon x_0^3 + \lambda\right) & \frac{K}{2h^2} & 0 \\ \frac{K}{2h^2} & \frac{1}{dt}-\frac{K}{h^2} & \frac{K}{2h^2} \\ 0 & \frac{K}{2h^2} & \frac{1}{dt}-\frac{K}{h^2}-\left(\frac{1}{h}\frac{1}{c_p\rho}4\sigma\varepsilon x_0^3 + \lambda\right) \end{bmatrix}$$

$$Q = -\begin{bmatrix} \frac{1}{h}\frac{1}{c_p\rho}\sigma\varepsilon(-3x_0^4 - T_a^4) - \lambda T_a \\ 0 \\ \frac{1}{h}\frac{1}{c_p\rho}\sigma\varepsilon(-3x_0^4 - T_a^4) - \lambda T_a \end{bmatrix} \tag{18}$$

Formula (20) is obtained due to the inverse matrix of matrix E being multiplied from the left side in formula (15).

$$\begin{bmatrix} x_{3,j+1} \\ x_{2,j+1} \\ x_{1,j+1} \end{bmatrix} = E^{-1}A_0\begin{bmatrix} x_{3,j} \\ x_{2,j} \\ x_{1,j} \end{bmatrix} + E^{-1}Q + \beta E^{-1}B_0 u_b \tag{19}$$

$$\begin{bmatrix} x_{3,j+1} \\ x_{2,j+1} \\ x_{1,j+1} \end{bmatrix} = A\begin{bmatrix} x_{3,j} \\ x_{2,j} \\ x_{1,j} \end{bmatrix} + Bu_b + F \tag{20}$$

Wherein, $$A = E^{-1}A_0 \tag{21}$$

$$F = E^{-1}Q \tag{22}$$

$$B = \beta E^{-1}B_0 \tag{23}$$

Formula (20) is the basic formula of a temperature change of a steel product 2. Note that, given that $u_b=0$ in this formula, the formula becomes a formula expressing a temperature change at the time of the process of cooling by the atmosphere.

Next, a formula expressing the temperature change from the position of the temperature detector 7 disposed before the induction heating device 6 to the position of the temperature detector 7 at the exit side of the induction heating device, is produced.

Figure 3:
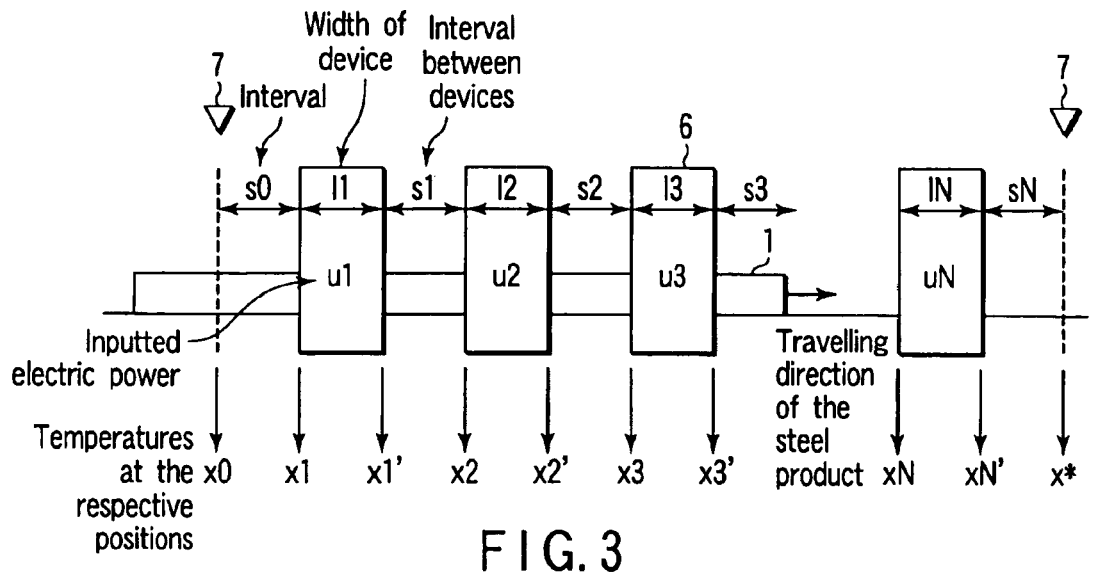
FIG. 3 is a diagram showing symbols used for formulas expressing temperature changes.

FIG. 3 is a diagram showing symbols used for the formulas expressing the temperature change.

The length of each induction heating devices 6 from the position of the temperature detector 7 disposed before the induction heating device 6 to the position of the temperature detector at the exit side of the induction heating device 6, is expressed by li, and an interval between the induction heating devices 6 is expressed by si, and the inputted electric power to each induction heating device 6 is expressed by ui. Further, a temperature at the entrance side of the induction heating device of the steel product 1 is expressed by $x_O$, and the temperature at the exit side of the induction heating device is expressed by $x^*_N$, and the temperatures before and behind each induction heating device are expressed by $x_i$ and $x'_i$.

Given that the length of the induction heating devices is li, and the interval thereof is si, and the conveying speed is v, and a number of sampling point in the difference equation is determined.

$$ni = li/(v \times dt) \tag{24}$$

$$mi = si/(v \times dt) \tag{25}$$

wherein, dt: sampling time, and ni, mi: number of sampling point

Therefore, the temperatures of the respective positions when the steel product 2 is sequentially heated by the induction heating devices are expressed by formula (26).

$$x_0 = \begin{bmatrix} x_{3,0} \\ x_{2,0} \\ x_{1,0} \end{bmatrix}, \quad x_1 = \begin{bmatrix} x_{3,ml} \\ x_{2,ml} \\ x_{1,ml} \end{bmatrix}, \quad x'_1 = \begin{bmatrix} x_{3,ml+nl} \\ x_{2,ml+nl} \\ x_{1,ml+nl} \end{bmatrix}, \tag{26}$$

$$x^* = \begin{bmatrix} x_{3,mN+nN+\cdots+ml+nl} \\ x_{2,mN+nN+\cdots+ml+nl} \\ x_{1,mN+nN+\cdots+ml+nl} \end{bmatrix}$$

The temperature change between the induction heating devices, for example, the temperature change between x0 and x1 is expressed by formula (27).

$$x_1 = A^{m0} x_0 + \left( \sum_{i=1}^{m0-1} A^i \right) F \tag{27}$$

Further, the temperature as the result of being heated by the first induction heating device, i.e., the temperature $x'_1$ at the exit side of the induction heating device is expressed by formula (28).

$$x'_1 = A^{nl} x_1 + \left( \sum_{i=1}^{nl-1} A^i \right) (F + Bu_1) \tag{28}$$

Formula (29) is obtained due to formula (27) being substituted for formula (28).

$$x'_1 = A^{nl+m0} x_0 + A^{nl} \left( \sum_{i=1}^{m0-1} A^i \right) F + \left( \sum_{i=1}^{nl-1} A^i \right) (F + Bu_1) \tag{29}$$

When this calculation is successively repeated, the temperature distribution of the steel product 1 at the thermometer position at the exit side of the Nth induction heating device is expressed as formula (30).

$$x^*_N = A^{mN+nN+\cdots+ml+nl+m0} x_0 + \tag{30}$$

$$A^{mN+nN+\cdots+ml} \left( \sum_{i=1}^{nl-1} A^i \right) (F + Bu1) +$$

$$A^{mN+nN+\cdots+m2} \left( \sum_{i=1}^{n2-1} A^i \right) (F + Bu2) + \cdots +$$

$$A^{mN} \left( \sum_{i=1}^{nN-1} A^i \right) (F + BuN) +$$

$$A^{mN+nN+\cdots+nl} \left( \sum_{i=1}^{m0-1} A^i \right) F +$$

$$A^{mN+nN+\cdots+m2+n2} \left( \sum_{i=1}^{ml-1} A^i \right) F + \cdots +$$

$$A^{mN+nN} \left( \sum_{i=1}^{m(N-1)-1} A^i \right) F + \left( \sum_{i=1}^{mN-1} A^i \right) F$$

By arranging this, it becomes the linear expressions of $U_1$, ..., $U_N$ as formulas (31) and (32).

$$x_N^* = X_0 x_0 + X_1 u_1 + \ldots + X_N u_N + X_{Nc} \tag{31}$$

$$x_N^* = (X_0 x_0 + X_{Nc}) + (X_1 \cdots X_N) \begin{pmatrix} u_1 \\ \vdots \\ u_N \end{pmatrix} \tag{32}$$

By using formula (32), the temperature distributions x1, ..., x* after induction heating can be determined by a calculation in accordance with the heating electric powers $u_1, \ldots, u_N$.

Figure 4:
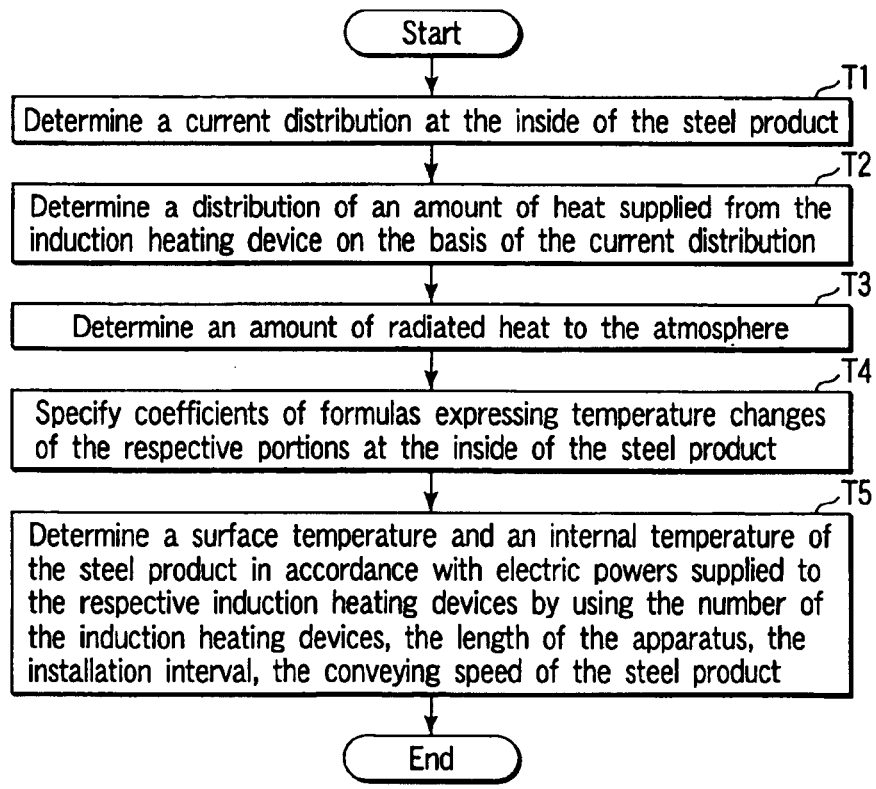
FIG. 4 is a flowchart showing the schematic procedure for determining a steel product temperature distribution after heating in accordance with heating electric power.

The calculating method which was described above can be achieved in the control device 10. FIG. 4 is a flowchart showing the schematic procedure for determining a steel product temperature distribution after heating in accordance with heating electric power.

At step T1, an electric power distribution at the inside of the steel product which will be heated is determined by formula (3). At step T2, a distribution of the amount of heat supplied from the induction heating device 6 is determined by formulas (8) through (10) on the basis of the electric power distribution. At step T3, the amount of radiated heat to the atmosphere is determined by formula (14). At step T4, coefficients expressed by formulas (21), (22), and (23) for determining the temperature change at the inside of the steel product are calculated by using these determined results.

At step T5, the temperature distribution of the steel product 1 is determined in accordance with electric power supplied by the induction heating device 6 by using the number of the induction heating devices 6, the length of the device, the interval between the devices, and the conveying speed of the steel product. At this time, the temperature distribution of the steel product 1 may be determined due to formulas (27) thorough (30) being applied, and the temperature distribution of the steel product 1 may be determined due to formula (32) being applied.

Next, a method in which the desired heat treatment is carried out by using the calculating method, i.e., the procedure for determining heating electric power, which is such that the steel product 1 has the target temperature distribution, will be described. The procedure can be achieved in the control device 10 having the above-described calculating procedure.

Figure 5:
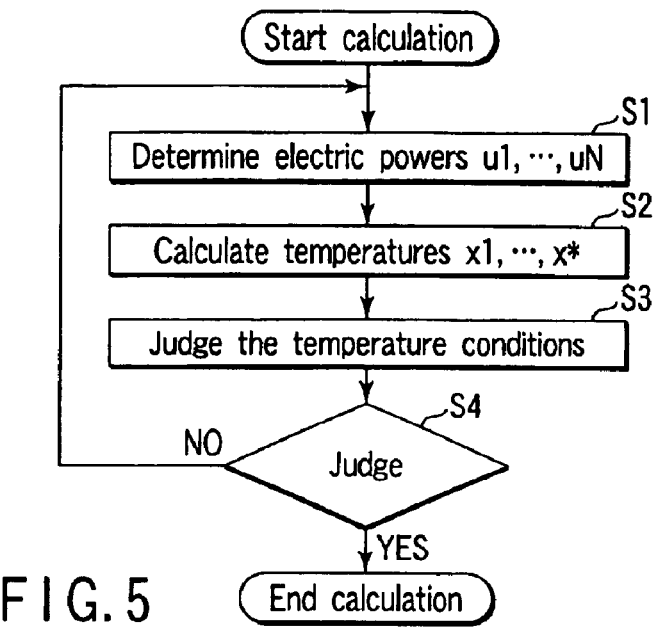
FIG. 5 is a chart showing the schematic flow of electric power computing processing for determining heating electric power.

FIG. 5 is a chart showing the schematic flow of electric power computing processing for determining heating electric power.

At step S1, appropriate initial value electric powers $u_1, \ldots, u_N$ are determined. At step S2, the heating temperature distributions $x1, \ldots, x^*$ at the exit side of the induction heating devices are calculated in accordance with the above-described calculating procedure (step T1 through T4). At step S3, the heating temperatures at the respective induction heating devices and the temperature condition which is a temperature range to be the target are compared with each other, and it is judged whether the temperature condition is satisfied or not.

In the case of Yes at step S4, i.e., when a heating temperature is fit for the temperature condition, it is judged that the heating electric power is the final heating electric power, and the calculation is completed. In the case of No at step S4, i.e., when a heating temperature is not fit for the temperature condition, new induction heating electric powers $u_1, \ldots, u_N$ are provided, and redoing of the temperature calculation is carried out.

Provided that the target temperature distribution $x^*$ at the exit side of the induction heating device is provided due to the above-described processing being repeatedly carried out, electric powers $u_1, \ldots, u_N$ which achieve it can be determined. Note that, as a method of providing the new heating electric powers $u_1, \ldots, u_N$, it suffices that a general method such as a linear programming, a nonlinear programming, or the like may be applied. If the temperature condition can be achieved, the solution can be determined by a finite number of calculations.

In the present embodiment, a temperature at the inside of the steel product can be calculated by using an arbitrary number of induction heating devices. Accordingly, it is possible to determine the internal temperature of the steel product 1 for each induction heating device in the heat treatment line, and to determine the internal temperature of the steel product 1 for every plural induction heating devices as well.

Accordingly, an electric power setting value in which the surface temperature of the steel product during the heating is heated so as to be less than or equal to the target surface temperature, and a temperature at a predetermined position at the inside of the steel product at the time of completing heating can be controlled so as to be within a predetermined range with respect to the target internal temperature, i.e., an electric power setting value for uniform heating processing, can be determined.

Further, an electric power setting value in which the surface temperature of the steel product during the heating is heated so as to be greater than or equal to the target surface temperature, and a temperature at a predetermined position at the inside of the steel product at the time of completing heating can be controlled so as to be less than or equal to the target internal temperature, i.e., an electric power setting value for surface layer heating processing, can be determined.

Next, a heat treatment apparatus of a second embodiment will be described. In the present embodiment, there is the feature in the point that heating electric power, which is such that the electric power consumption becomes a minimum is determined in the electric power computing processing of the first embodiment. Accordingly, because structures other than those are the same as those of the first embodiment, detailed description thereof will be omitted.

Figure 6:
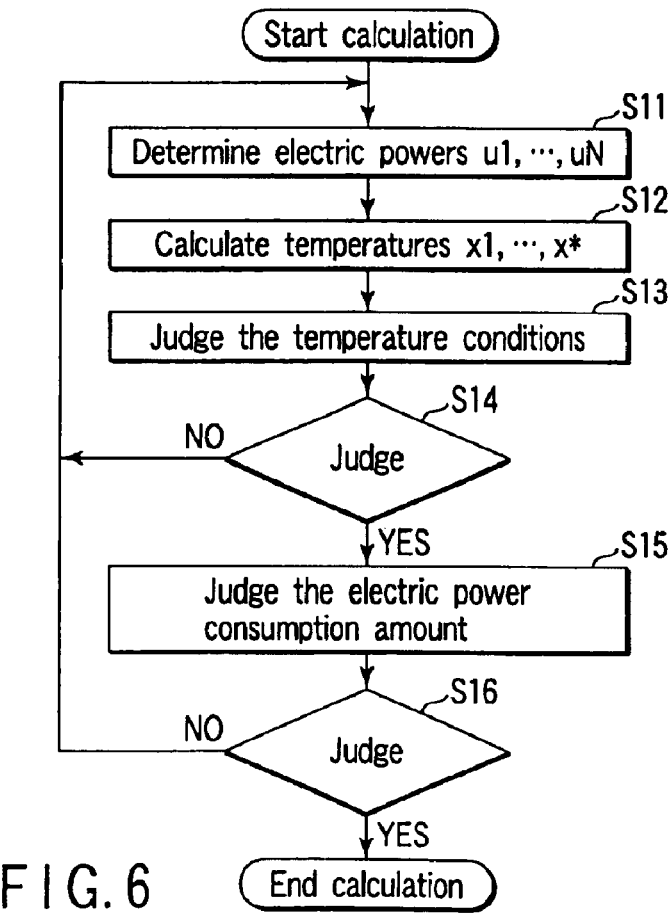
FIG. 6 is a chart showing the schematic flow of electric power computing processing for determining heating electric power according to other embodiments of the present invention.

FIG. 6 is a chart showing the schematic flow of electric power computing processing for determining heating electric power relating to the second embodiment.

At step S11, appropriate initial value electric powers $u_1, \ldots, u_N$ are determined. At step S12, the heating temperature distributions $x_1, \ldots, x^*$ at the exit side of the induction heating devices are calculated in accordance with the above-described calculating procedure of steps T1 through T4. At step S13, the heating temperatures at the respective induction heating devices and the temperature condition which is a temperature range to be the target are compared with each other, and it is judged whether the temperature condition is satisfied or not.

In the case of No at step S14, i.e., when a heating temperature is not fit for the temperature condition, new induction heating electric powers $u_1, \ldots, u_N$ are provided, and redoing of the temperature calculation is carried out. In the case of Yes at step S14, i.e., when a heating temperature is fit for the temperature condition, at step S15, a total electric power consumption which is the sum of the electric power consumption at the respective induction heating devices is determined, and it is judged whether the total electric power consumption becomes a minimum or not. Namely, heating electric power, which is such that the total electric power consumption in the induction heating devices becomes a minimum, is determined.

In the case of No at step S16, i.e., when it is not fit for the condition in which the total electric power consumption is less than or equal to a predetermined consumption, new induction heating electric powers are provided, and redoing of the temperature calculation is carried out. In the case of Yes at step S16, i.e., when it is fit for the condition in which the total electric power consumption is less than or equal to a predetermined consumption, it is judged that the heating electric power is the final heating electric power, and the calculation is completed.

The condition that the heating electric power is processed so as to be a minimum value is expressed by formula (33).

$$\sum_{i=1}^{N} u(i) \frac{li}{v} \to \text{minimum} \tag{33}$$

u(i): ith induction heating device heating electric power,
N: the number of the induction heating devices Namely, u(i) satisfying these conditions is the heating electric power whose electric power consumption is the least among the electric power settings of the uniform heating processing in which the surface temperatures of the steel product at all points in time during the process of heating do not exceed the upper limit temperature, and the internal temperature after completing the process of heating is heated so as to be within an internal temperature target range.

Further, u(i) is the heating electric power whose electric power consumption is the least among the electric power settings of the surface layer heating processing in which the surface temperatures of the steel product at all points in time during the process of heating are heated so as to be greater than or equal to a target surface temperature, and the internal temperature after completing the process of heating is heated so as to be less than or equal to the target internal temperature.

Note that, a method of providing the new heating electric powers $u_1, \ldots, u_N$, may be a general method such as a linear programming, a nonlinear programming, or the like. Further, an optimizing method such as a gene algorithm or the like may be applied.

Next, a heat treatment apparatus of a third embodiment will be described. In the present embodiment, there is the feature in the point that the appropriate heating electric power determined in the second embodiment is processed by using the nonlinear programming with the constraint conditions, such as a sequential quadratic programming or the like. Accordingly, because structures other than these are the same as those of the second embodiment, detailed description thereof will be omitted.

First, heating conditions and the like of the steel product in the first embodiment and the second embodiment are expressed by numerical formulas.

A conditional expression relating to the target temperature is expressed by formula (34) and formula (35).

$$T^* - T_r = 0 \tag{34}$$

$T^*$: central temperature value at the exit side of the induction heating device, $T_r$: central temperature target value $$T_{rs} - T_{is} \geq 0 \tag{35}$$

$T_{is}$: surface temperature at the exit side of the ith induction heating device, $T_{rs}$: surface temperature upper limit, wherein, $1 \leq i \leq N$.

Because the central temperature is the heating target, the central temperature is expressed by the condition of the equation. Because the surface temperature becomes highest at the exit side of the induction heating device, a temperature at the exit side of the induction heating device is used. Further, because the surface temperature is the heating upper limit, it is expressed by an inequality. However, with respect to the central temperature target, it is possible to designate a range as formula (36).

$$|T^* - T_r| \leq c \tag{36}$$

$T^*$: central temperature value at the exit side of the induction heating device, $T_r$: central temperature target value, c: target temperature range designated value These are the constraint conditions at the time of determining electric powers of the respective induction heating devices. Moreover, the induction heating device is limited in the ability thereof, this is the constraint condition by being expressed by formulas (37) and (38).

$$u(i) - u \min \geq 0 \tag{37}$$

wherein, umin: electric power minimum value $$-u(i) + u \max \geq 0 \tag{38}$$

wherein, umax: electric power maximum value

Moreover, in the constraint conditions of formulas (34) and (35), temperatures $T_N$ and $T_{is}$ can be expressed by using heating electric powers $u_1, \ldots, u_N$ of the induction heating devices. Namely, the constraint condition formulas (34) and (35) are expressed by the heating electric powers $u_1, \ldots, u_N$, by using formula (32).

First, formula (34) which is the heating condition of the equation is expressed by formulas (39) and (40).

$$T^* - T_r = 0 \tag{39}$$

$$C_N(X_0 x_0 + X_{Nc} + X_1 + \ldots + X_N u_N) - T_r = 0 \tag{40}$$

wherein, $C_N = [0\ 1\ 0]$.

Moreover, the constraint conditions of the inequality can be expressed by formulas (41) through (44).

$$T_{rs} - T_{is} \geq 0 \tag{41}$$

$$T_{rs} - f_1(u_1) \geq 0 \tag{42}$$

$$\ldots$$

$$T_r - T_{Ns} \geq 0 \tag{43}$$

$$T_r - f_N(u_1, \ldots, u_N) \geq 0 \tag{44}$$

wherein, $f(u_1), \ldots, f(u_1, \ldots, u_N)$: a linear expression of $u_1, \ldots, u_N$ In accordance therewith, because all of the objective functions and the constraint conditions are expressed by heating electric powers $u_1, \ldots, u_N$, a sequential quadratic programming which is an optimizing method can be applied. By arranging the above description again, it becomes as follows.

Objective function $$\sum_{i=1}^{N} u(i) \frac{li}{vi} \to \text{minimum} (i = 1, 2, \cdots, N)$$

u(i): ith induction heating device heating electric power, N: the number of the induction heating devices Equality constraint condition: $T^* - T_r = 0$, $T^*$: central temperature at the exit side of the induction heating device, $T_r$: central temperature target value Inequality constraint condition:

$$T_r - f_1(u_1) \geq 0$$

$$\ldots$$

$$T_r - f_N(u_1, \ldots, u_N) \geq 0$$

$f_1(u_1)$: surface temperature at the exit side of the first induction heating device, $T_r$: surface temperature upper limit, $f_N(u_N)$: surface temperature at the exit side of the Nth induction heating device, $T_r$: surface temperature upper limit $$u(i) - u_{min} \geq 0$$

$$-u(i) + u_{max} \geq 0$$

$u_{min}$: electric power minimum value, $u_{max}$: electric power maximum value Provided that this problem setting is optimized by using the sequential quadratic programming, a minimum heating electric power distribution satisfying the temperature condition can be determined. Namely, targets of a surface temperature and an internal temperature at the time of heating can be achieved by the minimum required electric power.

Next, a method for determining a conveying speed and electric power, which is the setting calculating function, will be described.

<1> Preliminary Processing Method

FIG. 7 is a block diagram of a system achieving the preliminary processing method. Because the structure of the manufacturing line of the steel product is the same as the above-described structure, the structure is denoted by the same reference numerals and detailed description thereof will be described.

Data relating to the steel product 1 for which manufacture is planned is transmitted from a production management computer 13 to a preliminary processing computing device 14. The data are the size (the width, the thickness, the length) of the steel product 1, heating method, a heating target temperature, or the like. Here, the preliminary processing computing device 14 is provided in the control device 10.

The preliminary processing computing device 14 determines a conveying speed, the number of passes, and electric power at the time of heating on the basis of the data. Further, the determined conveying speed is outputted to a conveying speed setting device 15, and the determined electric power is outputted to an electric power supply device 12.

Here, as the methods for determining a conveying speed, there are a method for extracting it from a table, and a method by a convergence calculation.

a. Method in which a Conveying Speed is Extracted from a Table

FIG. 8 is a view showing a correspondence table of the size, the conveying speeds, and the numbers of passes of the steel product.

The preliminary processing computing device 14 extracts a conveying speed and the number of passes in accordance with the width, the thickness, and the length which are the size of the steel product. Note that, when a value of data does not agree with an item value in the table, it is determined by interpolating the front and the rear values in the table.

Further, the table may be structured such that a conveying speed and the number of passes are extracted on the basis of at least one of data among the width, the thickness, and the length which are the size of the steel product.

b. Method for Determining a Conveying Speed by a Convergence Calculation

Figure 9:
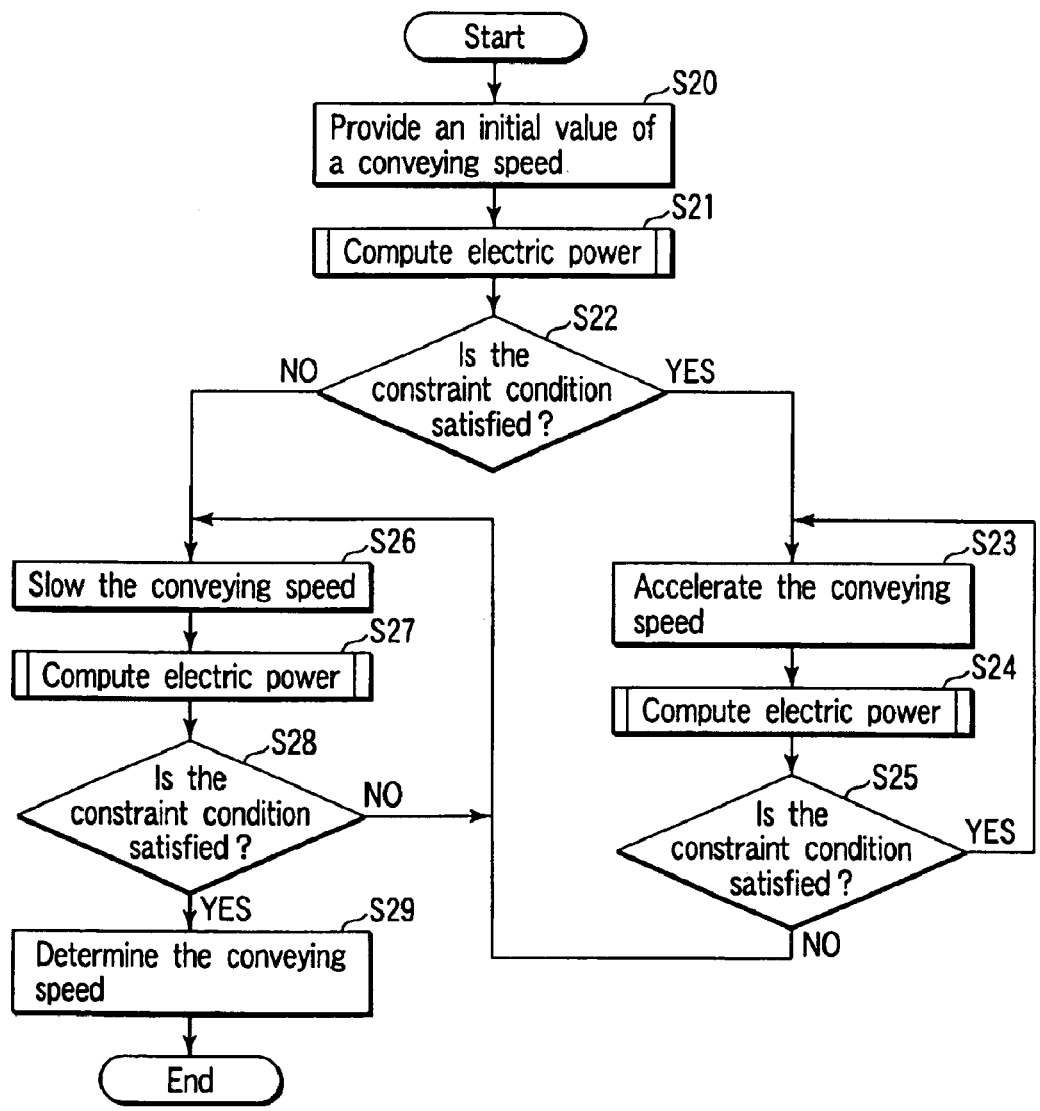
FIG. 9 is a flowchart showing the schematic procedures for determining a conveying speed by a convergence calculation.

FIG. 9 is a flowchart showing the schematic procedures for determining a conveying speed by a convergence calculation. In this method, there is the feature in the point that the conveying speed is determined such that the time required for the heat treatment is made to be the shortest among the heating electric powers satisfying the condition of the heating temperature.

Note that, when the steel product 1 is heated by being reciprocated through the induction heating device group plural times, it is possible to set a conveying speed for each pass. Accordingly, the conveying speed is defined by the following formula.

$$V0 = [V01, V02, V03, \ldots, V0n]$$

wherein, $V0$: conveying speed initial value $V0i$ ($i=1-n$): ith pass conveying speed initial value At step S20, an initial value is set as the conveying speed. Here, the initial value $V0$ may be an arbitrary value, and may be determined on the basis of an actual resulted value.

At step S21, heating electric power is determined due to the electric power computing shown in FIGS. 5 and 6 being carried out by using the conveying speed. At step S22, it is examined whether or not the temperature after heating the steel product 1 satisfies the constraint condition under this heating condition. The constraint condition is the same as the temperature judging conditions at step S3 of FIG. 5 and step S13 of FIG. 6, and is the condition for examining whether or not the surface temperature and the internal temperature of the steel product 1 are each within a predetermined temperature range.

In the case of Yes at step S22, i.e., when the constraint condition is satisfied, because it means that the electric power computing is appropriately executed, there is some possibility that appropriate electric energy is required even if it is the condition in which a conveying speed is made fast. Accordingly, at step S23, the conveying speed is made fast by a predetermined amount. Note that the conveying speed may be made fast by a predetermined ratio, and not by a predetermined amount. Further, the conveying speed may be increased on the basis of a function which was determined in advance.

At step S24, electric power computing is carried out again by using the increased conveying speed, and at step S25, it is examined whether or not the temperature after heating the steel product 1 satisfies the constraint condition. In the case of Yes at step S25, i.e., when the constraint condition is satisfied, steps S23 through S25 are further repeated. In accordance therewith, even faster conveying speed can be set.

In the case of No at step S25, i.e., when the constraint condition is not satisfied, the processing from step S26 in which the conveying speed is reduced and which will be described later, are executed. However, the routine does not proceed to this processing, and the conveying speed satisfying the constraint condition which was used for the previous calculation, may be used.

In the case of No at step S22, i.e., when the surface temperature and the internal temperature of the steel product 1 are each not within the predetermined temperatures, it means that the electric power computing was not correctly executed. Here, the case in which the electric power computing is not correctly executed is a case in which the temperature of the steel product 1 becomes low because the conveying speed is too fast. This is because, when the temperature of the steel product 1 is high, because it is possible to reduce the temperature due to the electric energy being reduced, the electric energy amount can be always determined.

Accordingly, in this case, because heating of the temperature of the steel product 1 is insufficient, at step S26, the conveying speed is made slow by a predetermined amount. Note that the conveying speed may be reduced by a predetermined ratio, not by a predetermined amount. Further, the conveying speed may be reduced on the basis of a relational expression or a function which was determined in advance.

Further, at step S27, electric power computing is carried out again by using the reduced conveying speed, and at step S28, it is examined whether or not the temperature after heating the steel product 1 satisfies the constraint condition.

In the case of No at step S28, i.e., when the constraint condition is not satisfied, steps S26 through S28 are further repeated. In the case of Yes at step S28, i.e., when the constraint condition is satisfied, at step S29, this conveying speed is used.

In accordance with the present method, a heating condition in which a conveying speed is the fastest, among the electric powers satisfying the predetermined constraint condition, can be obtained as the final result. Accordingly, a heat treatment condition in which a processing time becomes the shortest can be determined.

Note that, in the present method, the convergence calculation is carried out in accordance with the conveying speed initial value. However, the electric power computing may be carried out on the basis of a plurality of conveying speed values, and the fastest conveying speed may be determined among the conveying speeds satisfying the constraint condition. Further, a conveying speed corresponding to the data of the steel product 1 to be heated may be calculated by an interior division point method, on the basis of the combinations of the past conveying speed resulted value and the data (for example, the thickness, the width, or the like) of the steel product 1.

Further, heating electric power is determined due to the above-described electric power setting calculation being carried out on the basis of the conveying speed determined here. Further, heating of the steel product 1 is executed due to the determined heating electric power being transmitted to the electric power supply device 12, and due to the conveying speed being transmitted to the conveying speed setting device 15.

Next, a method for determining an influence coefficient of the conveying speed when the heating start temperature and the heating target temperature are changed, will be described.

Figure 10:
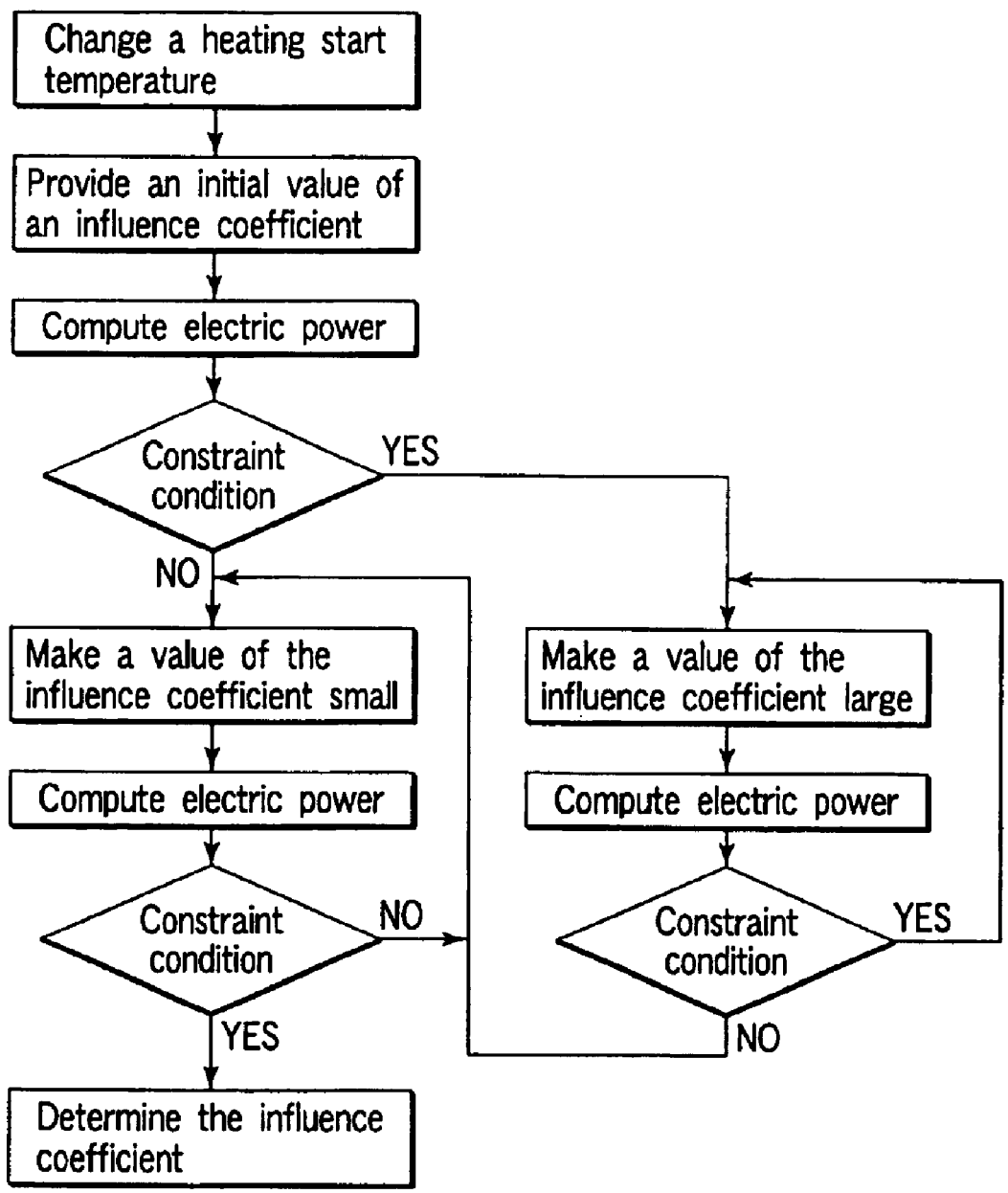
FIG. 10 is a flowchart showing the procedure for determining an influence coefficient when a heating start temperature is changed.

FIG. 10 is a flowchart showing the procedure for determining an influence coefficient when the heating start temperature is changed. In accordance with this procedure, given that the heating start temperature is Ti, and the changed amount of the heating start temperature is $\Delta$Ti, and when the heating start temperature is Ti+$\Delta$Ti, a coefficient expressing by how much the conveying speed determined in the above description should be changed, is determined.

This procedure is the same as the procedure for determining the conveying speed which was shown in FIG. 9. The processing is started given that the influence coefficient is 1, and the influence coefficient is adjusted so as to be able to be heated and such that the processing time is made shortest.

Provided that the value of the influence coefficient determined in this way is q, a conveying speed v' when the actual heating start temperature is Ti+$\Delta$T, is determined by formula (45).

$$v' = \left\{ (q-1) \frac{\Delta T}{\Delta Ti} + 1 \right\} v \qquad (45)$$

In the same way, a speed changing coefficient when the heating target temperature is changed is determined as well.

Figure 11:
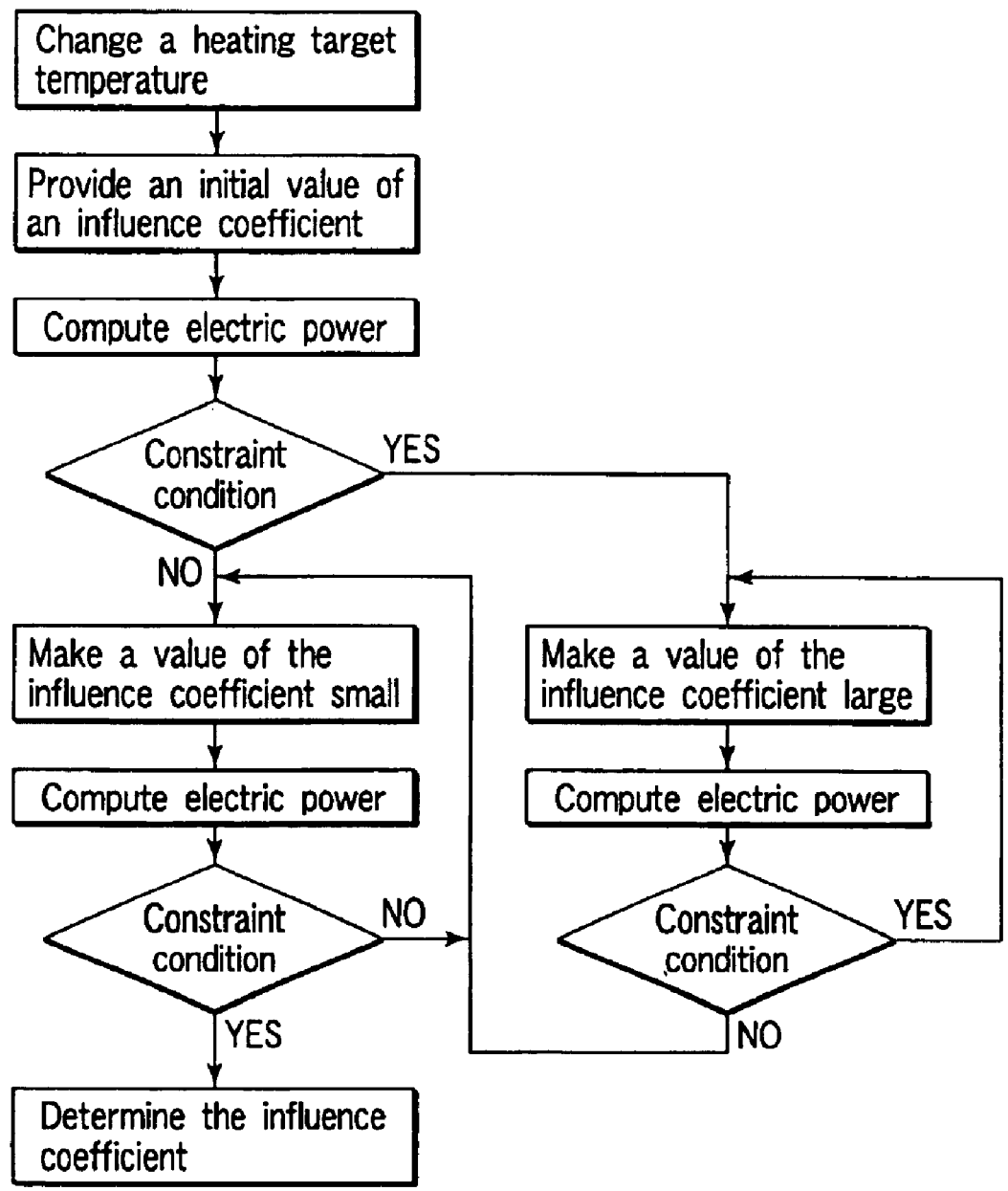
FIG. 11 is a flowchart showing the procedure for determining an influence coefficient when a heating target temperature is changed.

FIG. 11 is a flowchart showing the procedure for determining an influence coefficient when the heating target temperature is changed. In accordance with this procedure, given that the heating target temperature is Tr, and the changed amount of the heating target temperature is $\Delta$Tr, and when the heating target temperature is Tr+$\Delta$Tr, a coefficient expressing by how much the conveying speed determined in the above description should be changed, is determined.

This procedure is the same as the procedure for determining the conveying speed which was shown in FIG. 9. The processing is started given that the influence coefficient is 1, and the influence coefficient is adjusted so as to be able to be heated and such that the processing time is made shortest.

Given that the value of the influence coefficient determined in this way is q, a conveying speed v' when the actual heating start temperature is Tr+$\Delta$T is determined by the following formula (46).

$$v' = \left\{ (q-1) \frac{\Delta T}{\Delta Tr} + 1 \right\} v \qquad (46)$$

Note that the influence coefficient is used in the <2> Correction processing method and the <3> Combination processing method which will be described later.

<2> Correction Processing Method

Figure 12:
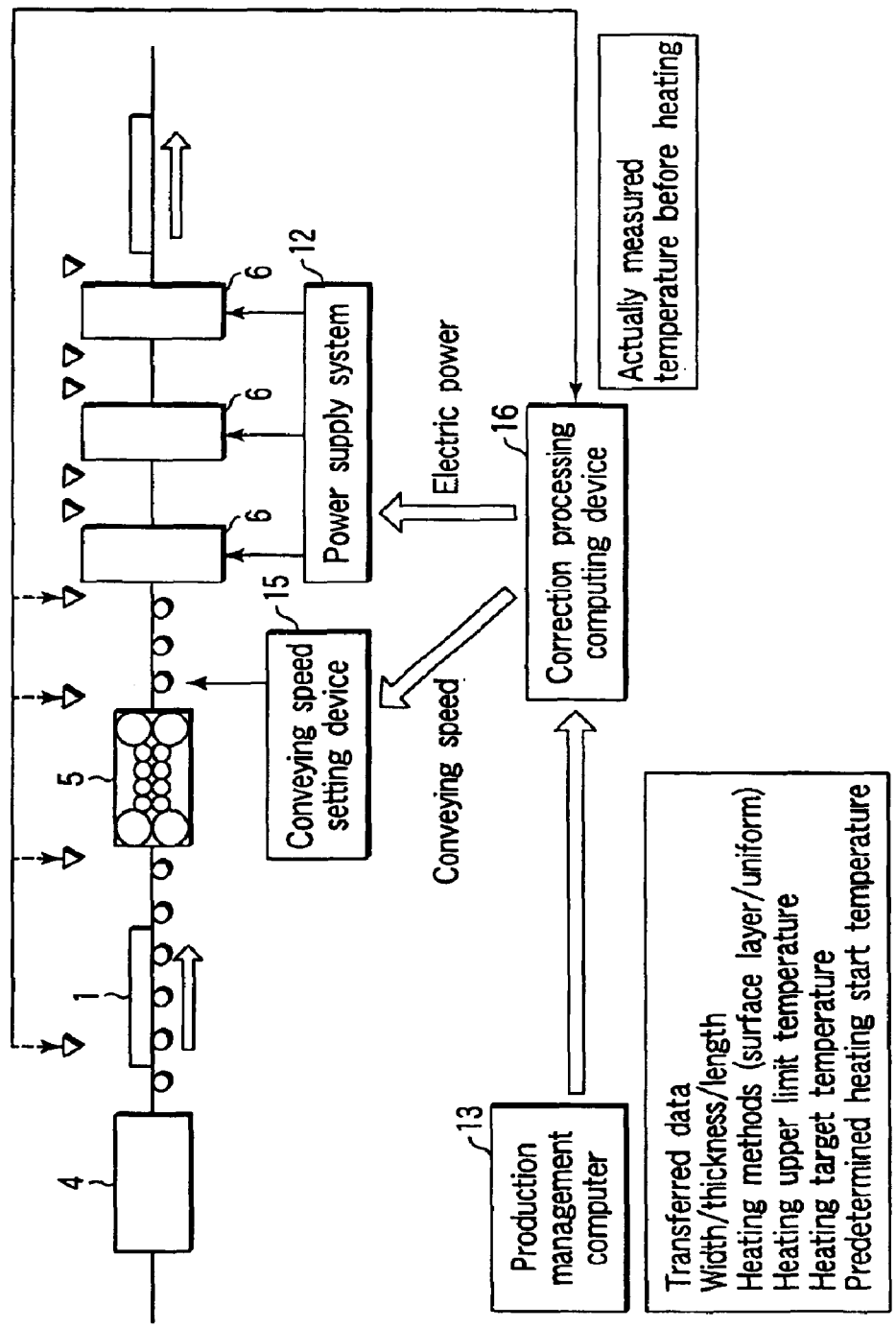
FIG. 12 is a diagram showing a structure of a system relating to a correction processing method.

FIG. 12 is a diagram showing a structure of a system relating to the correction processing method. Because the structure of the manufacturing line of the steel product is the same as the above-described structure, the structure is denoted by the same reference numerals and detailed description thereof will be omitted.

The present processing is processing in which a heating start temperature of the steel product 1 after accelerated cooling is actually measured, and determination of the conveying speed and a calculation of the heating electric power are carried out in accordance with the temperature.

This is carried out in accordance with the following procedures.

(i) Acquirement of the Heating Start Temperature and Determination of the Heating Target Temperature The heating start temperature of the steel product 1 is determined by actual measurement. Further, a correction processing computing device 16 determines the heating target temperature on the basis of the data from the production management computer 13.

(ii) Determination of the Conveying Speed

Next, the conveying speed is determined. The conveying speed can be determined due to the table values shown in FIG. 8 being interpolated. Further, when the conveying speed obtained by the method which was described in the b. convergence calculation, is used, the conveying speed is determined by being corrected by using formula (45) or formula (46) on the basis of the actually measured result of the heating start temperature.

(iii) Calculation of the Heating Electric Powers at the Front End Portion and the Tail End Portion of the Steel Product Because the heating electric powers at the front end portion and the tail end portion are different from each other, in accordance with the above-described method, i.e., the procedure for determining electric power shown in FIGS. 4 through 6, the heating electric powers at the front end portion and the tail end portion are each computed.

(iv) Calculation of Arrival Temperatures at the Front End Portion and the Tail End Portion of the Steel Product in the Respective Induction Heating Devices Moreover, the arrival temperatures at the entrance sides and the exit sides of the respective induction heating devices in the case of being heated by this electric power are stored with respect to the front end and the tail end. These arrival temperatures are target values at the time of carrying out the FF and FB controls.

(v) Interpolation of Electric Power and Temperature

Further, the heating electric power and the arrival temperature of the intermediate portion of the steel product are determined by interpolating the heating electric powers and the arrival temperatures at the front end portion and the tail end portion which were already determined.

<3> Combination Processing Method

FIG. 13 is a diagram showing a structure of a system relating to the combination processing method. Because the structure of the manufacturing line of the steel product is the same as the above-described structure, the structure is denoted by the same reference numerals and detailed description thereof will be omitted.

First, the preliminary processing computing device 14 executes the preliminary processing method. Namely, the conveying speed and the electric power are determined on the basis of the predetermined heating start temperature of the steel product 1. The determined conveying speed and electric power are transmitted to the correction processing computing device 16.

On the other hand, the temperature detector 7 actually measures a heating start temperature, before the induction heating device, of the steel product 1 after the process of cooling is completed. Further, this actually measured temperature is inputted to the correction processing computing device 16.

When the actually measured heating start temperature is close to the heating predetermined temperature, for example, when formula (47) is formed, heating is carried out in accordance with the conveying speed and the heating electric power which were determined by the preliminary processing.

$$|Tr0-Tr1|<=\alpha \qquad (47)$$

Tr0: predetermined heating start temperature, Tr1: heating start actually measured temperature, $\alpha$ is a predetermined value, for example, 10° C.

On the other hand, when formula (48) is formed, the correction processing computing device 16 carries out the above-descried correcting calculation, and corrects the conveying speed, and determines the heating electric power by an electric power setting calculation given that the corrected conveying speed is a new conveying speed.

$$|Tr0-Tr1|>\alpha \qquad (48)$$

The conveying speed and the electric power which were determined in this way are respectively transmitted to the conveying speed setting device 15 and the electric power supply device 12, and heating of the steel product 1 is carried out.

In this way, due to the preliminary processing and the correction processing being combined with each other, heating can be carried out by using efficient and appropriate conveying speed and heating electric power.

II. Tracking Processing Function

Figure 14:
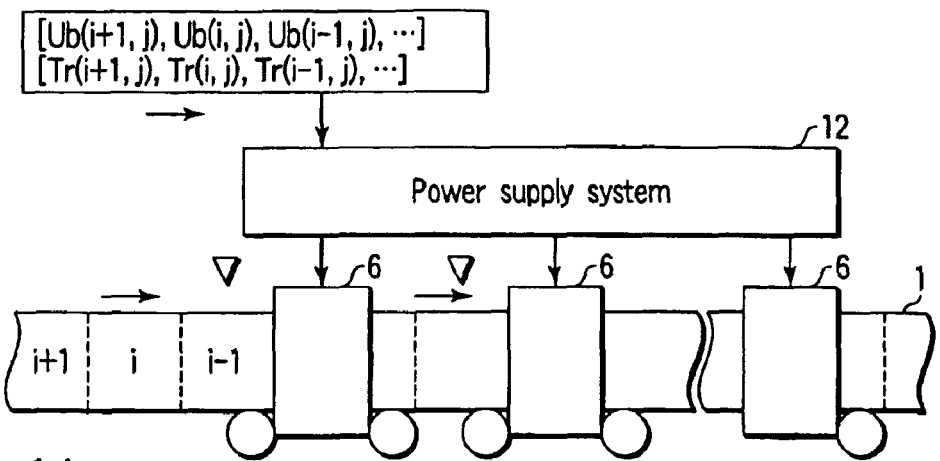
FIG. 14 is a diagram for explanation of the operation of a tracking processing.

In this processing, the steel product 1 is divided into imaginary blocks in the longitudinal direction, and electric power setting, the FF control, and the FB control are carried out for each block. FIG. 14 is a diagram for explanation of the operation of the tracking processing.

Electric power setting values of the respective blocks of the steel product are determined in accordance with the heating electric power, at the front end portion and the tail end portion of the steel product 1, which were determined in advance. With respect to the jth induction heating device, given that the setting electric power at the front end portion of the steel product 1 is $u_b(1, j)$, and the setting electric power at the tail end portion is $u_b(N, j)$, the setting electric power at the intermediate portion is expressed by formula (49).

$$u_b(i, j) = \frac{u_b(N, j) - u_b(1, j)}{(N-1)}(i-1) + u_b(1, j) \qquad (49)$$

In the same way, the target temperature at the intermediate portion is expressed by formula (50).

$$Tr(i, j) = \frac{Tr(N, j) - Tr(1, j)}{(N-1)}(i-1) + Tr(1, j) \qquad (50)$$

In the tracking processing, a current position of the steel product 1 is estimated at any time on the basis of a rotational speed signal inputted from a conveyance roll and a temperature detection signal of the temperature detector 7. Further, at the point in time when the corresponding blocks of the steel product 1 are put into the respective induction heating devices 6, electric powers corresponding to the blocks are outputted to the respective induction heating devices 6.

III. Heating Electric Power Correcting Function (the FF Control and the FB Control)

At the time of carrying out temperature estimation and electric power setting by using numerical formula models as described above, there are cases in which an error arises in the temperature due to an error in the numerical formula. Therefore, electric power is corrected by the actually measured temperatures of the steel product 1 which were measured at the temperature detectors 7 provided at the entrance side and the exit side of the induction heating device.

Figure 15:
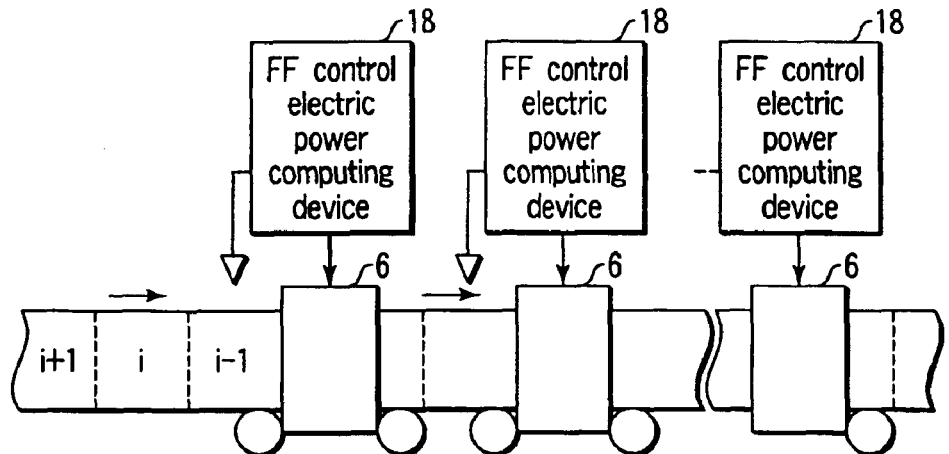
FIG. 15 is a diagram showing a structure of an FF control.
Figure 16:
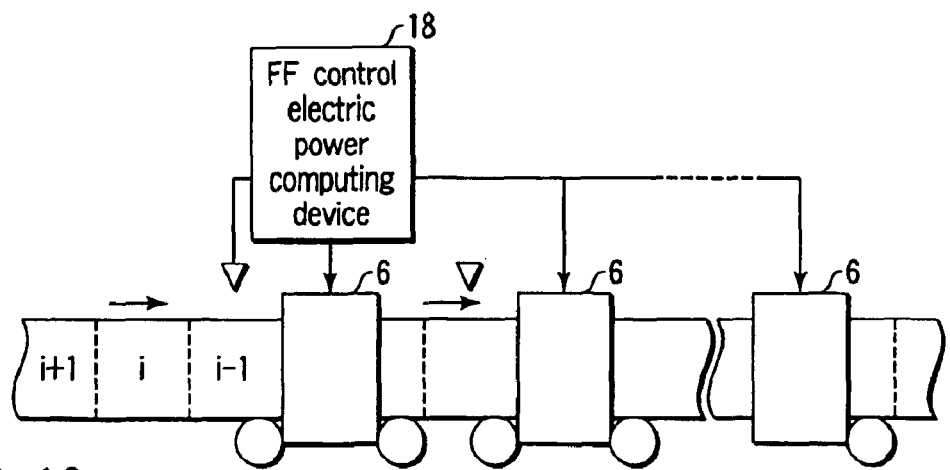
FIG. 16 is a diagram showing a structure of the FF control.

FIGS. 15 and 16 are diagrams showing structures of the FF control. An FF control electric power computing device 18 corrects electric power on the basis of a measurement signal of the temperature detector 7 provided at the entrance side of each induction heating device 6.

An electric power correction value of the jth induction heating device at the ith portion from the front end of the steel product 1 is provided by formula (51).

$$u_{ff}(i, j) = G(Tr(i, j) - Tm(i, j)) \times dPdt \qquad (51)$$

wherein, $u_{ff}(i, j)$: correction electric power, G: gain, Tr(i, j): target temperature, Tm(i, j): measured temperature, dpdt: electric power temperature influence coefficient.

Note that the FF control electric power computing device 18 may be provided for each induction heating device 6, or all of the induction heating devices 6 may be collectively controlled by the one FF control electric power computing device 18.

Figure 17:
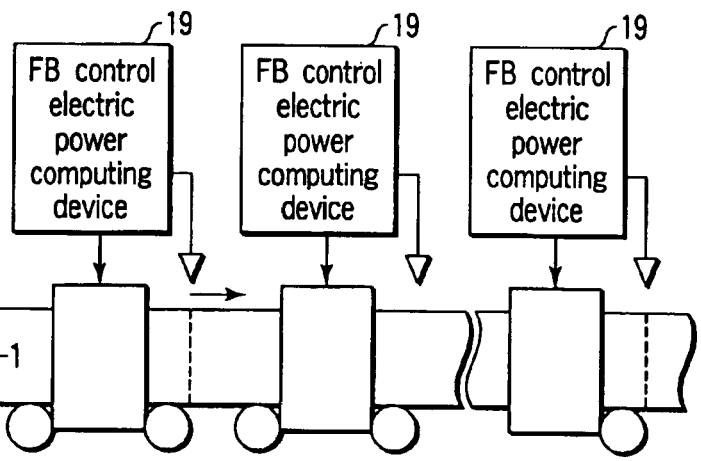
FIG. 17 is a diagram showing a structure of an FB control.
Figure 18:
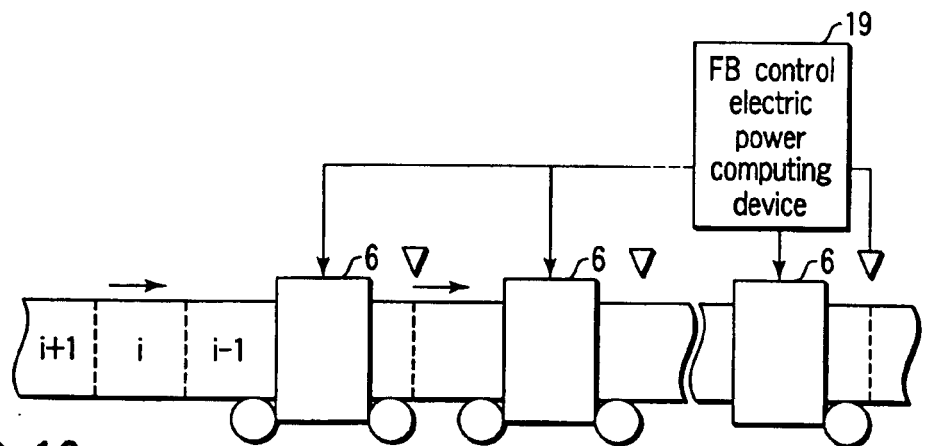
FIG. 18 is a diagram showing a structure of the FB control.

FIGS. 17 and 18 are diagrams showing structures of the FB control. An FB control electric power computing device 19 corrects electric power on the basis of a measurement signal of the temperature detector 7 provided at the exit side of each induction heating device 6. The electric power correction value is determined by formula (52).

$$u_{fb}(i, j) = [Gp(Tdr(i, j) - Tdm(i, j)) + \int Gi(Tdr(i, j) - Tdm(i, j))] \times dPdt \qquad (52)$$

wherein, $u_{fb}(i, j)$: correction electric power, Gp: gain, Gi: gain, Tr(i, j): target temperature, Tm(i, j): measured temperature, dPdt: electric power temperature influence coefficient.

Note that the FB control electric power computing device 19 may be provided for each induction heating device 6, and all of the induction heating devices 6 may be collectively controlled by the one FB control electric power computing device 19.

Moreover, it is effective to successively estimate a heating efficiency which will be described later, and to reflect to the results of the FF control and the FB control. The heating correction electric powers of this case are each $$u_{ff} = \beta G(Tr(i, j) - Tm(i, j)) \times dPdt \qquad (53)$$

$$u_{fb}(i, j) = \beta[Gp(Tr(i, j) - Tm(i, j)) + \int Gi(Tr(i, j) - Tm(i, j))] \times dPdt \qquad (54)$$

wherein, $\beta$: heating efficiency correction coefficient.

In this way, due to the correction being carried out by the measured temperature by the temperature detectors 7 provided before and behind the induction heating device 6, a temperature control accuracy can be improved.

IV. Model Learning Function

Figure 19:
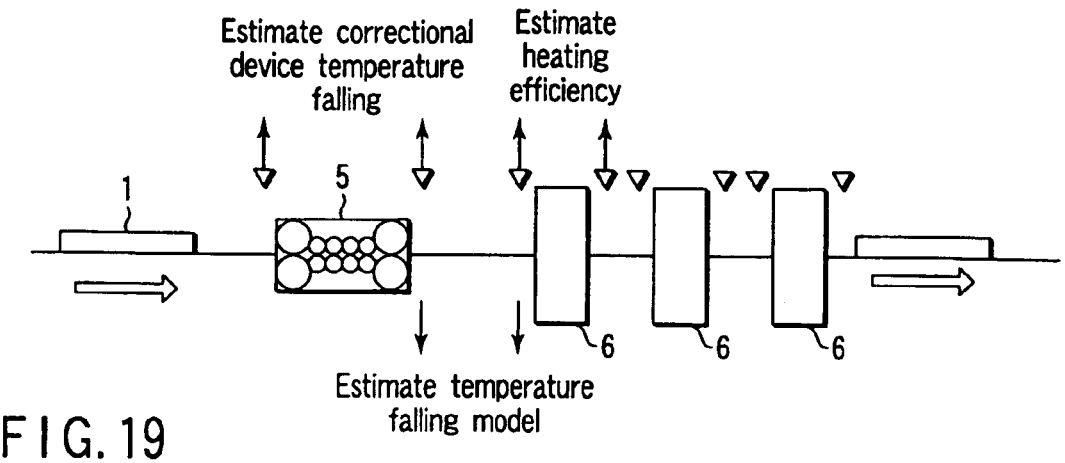
FIG. 19 is a diagram for explanation of the whole of a learning function.

FIG. 19 is a diagram for explanation of the whole of a learning function. The present model learning function has the following three learning functions.

<1> Learning of heating efficiency in which a heating efficiency of the induction heating device 6 is estimated <2> Air-cooling learning in which a temperature falling amount by air-cooling is estimated <3> A temperature falling estimated amount at a correctional device and model learning in which a temperature falling amount in the correctional device 5 is estimated Hereinafter, these learning methods will be described.

<1> Learning of Heating Efficiency

It is supposed that distances of section 1, section 2, and section 3 in FIG. 2 are respectively 11, 12, and 13, and passing speeds of the respective sections are respectively v1, v2, and v3. Further, a temperature distribution x (k) of the steel product 1 is defined by the following formula.

$$x(k) = \begin{bmatrix} x_{3,k} \\ x_{2,k} \\ x_{1,k} \end{bmatrix}$$

A temperature at the tail end of section 1 is expressed by formula (56).

$$n1 = l1/(v1 \times dt) \tag{55}$$

$$x(k+n1) = A^{n1}x(k) + \sum_{i=1}^{n1} A^{i-1}F \tag{56}$$

Given that the electric energy at the induction heating device 6 is $u_b$, a temperature at the tail end of section 2 is expressed by formula (58).

$$n2 = l2/(v1 \times dt) \tag{57}$$

$$x(k+n1+n2) = A^{n1+n2}x(k) + \sum_{i=i}^{n1+n2} A^{i-1}F + \beta \sum_{i=1}^{n2} A^{i-1}Bu_b \tag{58}$$

Moreover, a temperature at the tail end of section 3 is expressed by formula (61).

$$n3 = l2/(v3 \times dt) \tag{59}$$

$$N = n1+n2+n3 \tag{60}$$

$$x(k+N) = A^N x(k) + \sum_{i=1}^{N} A^{i-1}F + \beta A^{n3} \sum_{i=1}^{n2} A^{i-1}Bu_b \tag{61}$$

Because it suffices that $u_b$ is determined such that this becomes equal to the target temperature $T_r$, formula (62) relating to learning is determined.

$$T_r = c_x x(k+N) \tag{62}$$

Due to learning formula (62), the electric energy supplied to the induction heating device 6 for being heating to the target temperature $T_r$ is provided by formula (63).

$$u_b = \left(T_r - c_x A^N x(k) - c_x \sum_{i=1}^{N} A^{i-1}F\right) \bigg/ \left(\beta c_x A^{n3} \sum_{i=1}^{n2} A^{i-1}B\right) \tag{63}$$

However, due to loss in electric power at the induction heating device 6, or heating loss when the supplied electric energy rises a temperature of the steel product 1, or the like, even if the electric energy provided by formula (63) is supplied to the induction heating device 6, there are a large number of cases in which the temperature rising amount of the steel product 1 does not arrive the target temperature rising amount.

Therefore, a heating efficiency in which the supplied electric energy affects on the temperature rise of the steel product 1 is calculated due to an actual temperature rising amount being determined, and considering of the heating efficiency of the induction heating device 6, the supplied electric energy for obtaining the target temperature rising amount is calculated.

A time in which a portion at which there is a material to be heated passes between the temperature detectors is determined in accordance with the conveying speed of the steel product 1 and the setting interval of the temperature detectors 7 provided at the entrance side and the exit side of the induction heating device 6.

As shown in FIG. 2, given that moving speeds at section 1, section 2, and section 3 of the ith portion from the front end are respectively v1(i), v2(i), and v3(i), the passage time between the temperature detectors is determined by the following formula (64).

$$t_b(i) = l1/v1(i) + l2/v2(i) + l3/v3(i) \tag{64}$$

wherein, $t_b(i)$: passage time between the temperature detectors

Accordingly, at the temperature detectors 7 at the entrance side and the exit side of the induction heating device 6, temperatures at the same position of the steel product 1 are detected with time difference $t_b(i)$. Further, the temperature difference detected by the temperature detectors 7 at that time is the actual temperature rising amount of the steel product 1. Moreover, due to the detections of the temperature detectors 7 being periodically carried out, the temperature rising amount of the entire steel product 1 can be detected.

Note that given that the detected temperatures of the ith section from the front end of the steel product 1 is $T_{bi}(i)$, and it is assumed that the temperature distribution at the entrance side temperature detector position is uniform.

$$x(k, i) = \begin{bmatrix} T_{bi}(i) \\ T_{bi}(i) \\ T_{bi}(i) \end{bmatrix} \tag{65}$$

Wherein, $T_{bi}(i)$: detected temperature of the ith section from the front end of the material to be heated, x(k, i): temperature of the ith section from the front end of the material to be heated at time k In formula (30), given that an ith efficiency is $\beta(i)$, and when the supplied electric energy $u_b(i)$ is provided, a temperature $T_{bo}(i)$ at the exit side temperature detector position becomes formula (66).

$$T_{bo}(i) = c_x \left(A^N x(k, i) + \sum_{i=1}^{N} A^{i-1}F + \beta(i)A^{n3} \sum_{i=1}^{n2} A^{i-1}Bu_b(i)\right) \tag{66}$$

The heating efficiency is a ratio of the electric energy actually used for heating among the provided electric energy, and is expressed by formula (67) due to formula (66) being modified.

$$\beta(i) = \left(T_{bo}(i) - c_x A^N x(k, i) - c_x \sum_{i=1}^{N} A^{i-1}F\right) \bigg/ \left(c_x A^{n3} \sum_{i=1}^{n2} A^{i-1}Bu_b(i)\right) \tag{67}$$

Wherein, $\beta(i)$: heating efficiency, $u_b(i)$: electric energy supplied to the heating device Further, by using the estimated heating efficiency, electric energy supplied to the following induction heating device 6 is provided by the following formula (68).

$$u_b(i) = \left(T_{bo}(i) - c_x A^N x(k, i) - c_x \sum_{i=1}^{N} A^{i-1} F\right) / \left(\beta(i) c_x A^{n3} \sum_{i=1}^{n2} A^{i-1} B u_b(i)\right) \quad (68)$$

The control device 10 of FIG. 2 periodically carries out the above-described calculation, and provides it as the target electric energy to the induction heating device 6.

Namely, a heating efficiency is estimated due to measurements at the temperature detectors 7 being periodically carried out. Further, the estimated result of the heating efficiency is reflected to the inputting electric power calculation at the induction heating device 6 through which the current steel product 1 passes next time. In accordance therewith, an accuracy in the temperature control of the steel product 1 can be improved.

Further, the efficiency β(i) determined above can be used at the time of calculating inputting electric power of the next block at the induction heating device. Namely, the heating efficiency and the inputting electric power are expressed by the following formulas (69) and (70).

$$\beta(i) = \left(T_{bo}(i) - c_x A^N x(k, i) - c_x \sum_{i=1}^{N} A^{i-1} F\right) / \left(c_x A^{n3} \sum_{i=1}^{n2} A^{i-1} B u_b(i)\right) \quad (69)$$

$$u_b(i) = \left(T_{bo}(i) - c_x A^N x(k, i) - c_x \sum_{i=1}^{N} A^{i-1} F\right) / \left(\beta(i) c_x A^{n3} \sum_{i=1}^{n2} A^{i-1} B u_b(i)\right) \quad (70)$$

Because efficiency estimation considering the temperature distribution of the steel product 1 is carried out, and the result thereof is reflected to the next block, an accuracy in the temperature control can be improved.

<2> Air-Cooling Learning

Learning of heat transfer calculation of a steel product is carried out due to an amount of released heat due to convection with the atmosphere or heat transfer being estimated in the temperature estimating calculation shown in formula (9).

As shown in formula (71), it is supposed that Q' in which an adjustment factor γ is multiplied by an amount of heat Q is the amount of released heat of the atmosphere. A temperature calculation is carried out while changing the adjustment factor γ, and a convergence calculation is carried out such that the measured temperature and the estimated temperature are close to each another.

$$Q'=\gamma Q \quad (71)$$

It can be considered that γ is stored by being categorized in accordance with the size of a steel product or the steel types.

<3> A Temperature Falling Amount Estimation at the Correctional Device and Model Learning A temperature falling amount at the correctional device 5 can be determined by formula (72) by considering releasing of heat by a roll of the correctional device 5, releasing of heat by the atmosphere in the correctional device, and releasing of heat by cooling water.

$$T_L = \Delta T_R + \Delta T_A + \Delta T_W \quad (72)$$

$T_L$: temperature falling amount estimated value at the correctional device $\Delta T_R$: contacting releasing of heat by roll, $\Delta T_A$: cooling by the atmosphere, $\Delta T_W$: cooling by water cooling Moreover, respective terms of releasing of heat are expressed by formulas (73) through (76).

$$\Delta T_R = h_R(T_S - T_R)/\sqrt{\tau_R}\tau_R \quad (73)$$

$$\tau_R = L_R/v \quad (74)$$

$h_R$: roll heat transfer coefficient, $T_S$: steel product surface temperature, $T_R$: roll surface temperature $\tau_R$: roll contacting time, $L_R$: roll contacting distance, v: conveying speed $$\Delta T_A = h_A(T_A - T_S) \quad (75)$$

$\Delta T_A$: temperature cooled by the atmosphere $h_A$: heat transfer coefficient of the atmosphere, $T_A$: atmospheric temperature $$\Delta T_W = h_W(T_W - T_S) \quad (76)$$

$\Delta T_W$: temperature cooled by water cooling $h_W$: heat transmissibility of water cooling, $T_W$: cooling water temperature However, with respect to these temperature estimated values, effects due to secular changes such as errors in measurement accompanying actual measurement, wear of the roll, the state of application of cooling water, or the like, are great. Then, these estimated formulas are corrected by using the temperatures resulted, before and behind the correctional device 5. The correction formula is provided by formula (77).

$$\hat{T}_L = \alpha T_L \quad (77)$$

$T_L$: corrected temperature falling amount at the correctional device, α: adjustment factor The adjustment factor α is determined by formula (78).

$$\alpha = (T_L - T_A - T_W)/(t_0 - t_1) \quad (78)$$

$t_0$: correctional device entrance side temperature, $t_1$: correctional device exit side temperature Provided that the adjustment factor determined by formula (78) is used, the error in the temperature estimated formula of the correctional device 5 can be corrected, and the secular change in the temperature falling amount can be corrected.

The adjustment factor a determined in this way is used at the time of determining heating electric power after the next material. Further, the adjustment factors a are stored by being categorized by the thickness, the width, the temperature rising amount of the steel product 1, and can be used for a steel product having the same heating condition, after the next material.

In accordance with the present invention, a heat treatment in which a surface temperature and an internal temperature of a steel product are high-accurately made consistent with targets, and the steel product has the target characteristics, can be carried out.

What is claimed is:

1. A heat treatment apparatus comprising:
   a plurality of induction heating devices which heat a steel product;
   a correctional device for correcting the steel product;
   a computing device which computes supply predetermined electric power which is supplied to the induction heating devices, on the basis of a size of the steel product, a conveying speed of the steel product, heating target temperatures of the steel product, and a predetermined temperature of the steel product at the previous stage of the induction heating devices; and
   a power supply unit which supplies the supply predetermined electric power computed by the computing device to the induction heating devices,
   wherein the computing device computes supply predetermined electric power to be supplied to the induction heating devices in order to heat the steel product so that the steel product has a surface temperature equal to or lower than a first target temperature while being heated, and a difference between a second target temperature and a temperature which the steel product has at a predetermined position in the thickness direction of the steel product when the heating is completed falls within a predetermined range, or so that the steel product has a surface equal to or higher than a third target temperature while being heated and has a temperature equal to or lower than a fourth target temperature at the predetermined position in the thickness direction of the steel product when the heating is completed.

2. The heat treatment apparatus according to claim 1, wherein the induction heating devices are disposed on a rolling line of the steel product, and heat the steel product which was swiftly cooled by an accelerated cooling device after rolling.

3. The heat treatment apparatus according to claim 1, wherein the conveying speed of the steel product is a conveying speed determined in advance on the basis of the size of the steel product.

4. The heat treatment apparatus according to claim 1, wherein the computing device includes:
   temperature estimating means for estimating a surface temperature of the steel product and an internal temperature in the thickness direction after induction heating on the basis of the data including the conveying speed of the steel product and the supply predetermined electric power;
   fitting judging means for judging whether or not the surface temperature of the steel product and the internal temperature in the thickness direction are fit for predetermined temperature conditions;
   judging processing means for correcting the supply predetermined electric power when they are not fit for the temperature conditions, and for repeatedly executing the temperature estimating means and the fitting judging means; and
   electric power determining means for determining the supply predetermined electric power used for the computing as electric power which is supplied to the induction heating devices when they are fit for the temperature conditions.

5. The heat treatment apparatus according to claim 1, wherein the computing device includes:
   temperature estimating means for estimating a surface temperature of the steel product and an internal temperature in the thickness direction after induction heating on the basis of the data including the conveying speed of the steel product and the supply predetermined electric power;
   fitting judging means for judging whether or not the surface temperature of the steel product and the internal temperature in the thickness direction are fit for predetermined temperature conditions;
   judging processing means for correcting the supply predetermined electric power when they are not fit for the temperature conditions, and for repeatedly executing the temperature estimating means and the fitting judging means;
   electric energy judging means for judging whether or not a total value of electric energy of the respective induction heating devices used for the heating of the steel product is fit for the electric power condition which is less than or equal to a predetermined value, on the basis of the supply predetermined electric power used for the computing when they are fit for the temperature conditions; and
   electric power determining means for determining the supply predetermined electric power used for the computing as electric power which is supplied to the induction heating devices when they are fit for the temperature conditions.

6. The heat treatment apparatus according to claim 1, wherein the computing device includes:
   temperature estimating means for estimating a surface temperature of the steel product and an internal temperature in the thickness direction after induction heating on the basis of the data including the conveying speed of the steel product and the supply predetermined electric power;
   fitting judging means for judging whether or not the surface temperature of the steel product and the internal temperature in the thickness direction are fit for predetermined temperature conditions; and
   electric power determining means for determining supply predetermined electric power in which a total value of the electric energy of the respective induction heating devices used for the heating of the steel product becomes a minimum, among the supply predetermined electric powers which are fit for the temperature conditions, as electric power which is supplied to the induction heating devices.

7. The heat treatment apparatus according to claim 1, wherein the computing device further includes
   temperature distribution estimating means for estimating a temperature distribution in the thickness direction of the steel product after being heated by the induction heating devices.

8. The heat treatment apparatus according to claim 7, wherein the temperature distribution estimating means includes:
   generated heat amount calculating means for obtaining an induced current distribution in the thickness direction of the steel product present in the induction heating devices, in accordance with a speed at which the steel product is being transported, and for calculating an amount of heat generated in the steel product;
   radiated heat amount calculating means for calculating a radiated heat amount from the steel product to the atmosphere at the outside of the induction heating devices; and temperature computing means for estimating a surface temperature of the steel product and an internal temperature in the thickness direction due to a heat conduction to the inside of the steel product being computed with the generated heat amount and the radiated heat amount serving as the boundary conditions.

9. The heat treatment apparatus according to claim 7, wherein the temperature distribution estimating means includes cooling temperature estimating means for estimating a temperature falling amount in the thickness direction of the steel product by a correctional device.

10. The heat treatment apparatus according to claim 1, wherein the computing device further includes heating history managing means for imaginarily dividing into a plurality of sections in the longitudinal direction of the steel product, and for managing the history, in unit of the section, of the heating electric power used for the heating of the steel product and the temperature detected value of the steel product.

11. The heat treatment apparatus according to claim 1, wherein the computing device includes:

temperature estimating means for estimating a surface temperature of the steel product and an internal temperature in the thickness direction after induction heating on the basis of the data including the conveying speed of the steel product and the supply predetermined electric power;

fitting judging means for judging whether or not the surface temperature of the steel product and the internal temperature in the thickness direction are fit for predetermined temperature conditions; and electric power determining means for determining supply predetermined electric power in which the conveying speed of the steel product becomes a maximum, among the supply predetermined electric powers which are fit for the temperature conditions, as electric power which is supplied to the induction heating devices.

12. The heat treatment apparatus according to claim 1, wherein the computing device includes:

temperature estimating means for estimating a surface temperature of the steel product and an internal temperature in the thickness direction after induction heating on the basis of the data including the conveying speed of the steel product and the supply predetermined electric power;

fitting judging means for judging whether or not the surface temperature of the steel product and the internal temperature in the thickness direction are fit for predetermined temperature conditions;

judging processing means for correcting the supply predetermined electric power when they are not fit for the temperature conditions, and for repeatedly executing the temperature estimating means and the fitting judging means;

electric power judging means for judging whether or not a total value of electric energy of the respective induction heating devices used for the heating of the steel product is fit for the electric power condition which is less than or equal to a predetermined value, on the basis of the supply predetermined electric power used for the computing when they are fit for the temperature conditions; and conveying speed computing means for repeatedly executing the temperature estimating means, the fitting judging means, the judging processing means, and the electric power judging means, until it is not fit for the temperature conditions, by using a new conveying speed in which the conveying speed is increased when they are fit for the temperature conditions, and for acquiring the conveying speed which is fit for the temperature condition and the electric power condition and which was used for the final computing, as the new conveying speed.

13. A heat treatment apparatus comprising:

a plurality of induction heating devices which are disposed on a rolling line of a steel product, and which are arranged at the rear stage of an accelerated cooling device swiftly cooling the rolled steel product;

a correctional device which corrects the steel product;

at least one temperature detector which is disposed on the rolling line and which detects a temperature of the steel product;

a computing device which computes supply predetermined electric power which is supplied to the induction heating devices, on the basis of a size of the steel product, a conveying speed of the steel product, a heating target temperature of the steel product, and an actually measured temperature of the steel product measured by the temperature detector at the previous stage of the induction heating devices; and a power supply unit which supplies the supply predetermined electric power computed by the computing device to the induction heating devices, wherein the computing device computes supply predetermined electric power to be supplied to the induction heating devices in order to heat the steel product so that the steel product has a surface temperature equal to or lower than a first target temperature while being heated, and a difference between a second target temperature and a temperature which the steel product has at a predetermined position in the thickness direction of the steel product when the heating is completed falls within a predetermined range, or so that the steel product has a surface equal to or higher than a third target temperature while being heated and has a temperature equal to or lower than a fourth target temperature at the predetermined position in the thickness direction of the steel product when the heating is completed.

14. The heat treatment apparatus according to claim 13, wherein the computing device includes:

estimating means for estimating a steel product temperature after being heated on the basis of the conveying speed and the steel product temperature which was measured by the temperature detector;

repeating means for changing the conveying speed when the estimated steel product temperature is not within a predetermined temperature range, and for repeatedly executing the estimating means; and electric power computing means for computing supply predetermined electric power which is supplied to the induction heating devices in order to heat the steel product to a target temperature on the basis of the conveying speed when the estimated steel product temperature is within the predetermined temperature range.

15. The heat treatment apparatus according to claim 13, wherein the computing device includes:

temperature estimating means for estimating a surface temperature of the steel product and an internal temperature in the thickness direction after induction heating on the basis of the data including the conveying speed of the steel product and the supply predetermined electric power;

fitting judging means for judging whether or not the surface temperature of the steel product and the internal temperature in the thickness direction are fit for predetermined temperature conditions;

judging processing means for correcting the supply predetermined electric power when they are not fit for the temperature conditions, and for repeatedly executing the temperature estimating means and the fitting judging means; and electric power determining means for determining the supply predetermined electric power used for the computing as electric power which is supplied to the induction heating devices when they are fit for the temperature conditions.

16. The heat treatment apparatus according to claim 13, wherein the computing device includes:

temperature estimating means for estimating a surface temperature of the steel product and an internal temperature in the thickness direction after induction heating on the basis of the data including the conveying speed of the steel product and the supply predetermined electric power;

fitting judging means for judging whether or not the surface temperature of the steel product and the internal temperature in the thickness direction are fit for predetermined temperature conditions;

judging processing means for correcting the supply predetermined electric power when they are not fit for the temperature conditions, and for repeatedly executing the temperature estimating means and the fitting judging means;

electric energy judging means for judging whether or not a total value of electric energy of the respective induction heating devices used for the heating of the steel product is fit for the electric power condition which is less than or equal to a predetermined value, on the basis of the supply predetermined electric power used for the computing when they are fit for the temperature conditions; and electric power determining means for determining the supply predetermined electric power used for the computing as electric power which is supplied to the induction heating devices when they are fit for the temperature conditions.

17. The heat treatment apparatus according to claim 13, wherein the computing device includes:

temperature estimating means for estimating a surface temperature of the steel product and an internal temperature in the thickness direction after induction heating on the basis of the data including the conveying speed of the steel product and the supply predetermined electric power;

fitting judging means for judging whether or not the surface temperature of the steel product and the internal temperature in the thickness direction are fit for predetermined temperature conditions; and electric power determining means for determining supply predetermined electric power in which a total value of the electric energy of the respective induction heating devices used for the heating of the steel product becomes a minimum, among the supply predetermined electric powers which are fit for the temperature conditions, as electric power which is supplied to the induction heating devices.

18. The heat treatment apparatus according to claim 13, wherein the computing device further includes temperature distribution estimating means for estimating a temperature distribution in the thickness direction of the steel product after being heated by the induction heating devices.

19. The heat treatment apparatus according to claim 18, wherein the temperature distribution estimating means includes:

generated heat amount calculating means for obtaining an induced current distribution in the thickness direction of the steel product present in the induction heating devices, in accordance with a speed at which the steel product is being transported, and for calculating an amount of heat generated in the steel product;

radiated heat amount calculating means for calculating a radiated heat amount from the steel product to the atmosphere at the outside of the induction heating devices; and temperature computing means for estimating a surface temperature of the steel product and an internal temperature in the thickness direction due to a heat conduction to the inside of the steel product being computed, with the generated heat amount and the radiated heat amount serving as the boundary conditions.

20. The heat treatment apparatus according to claim 18, wherein the temperature distribution estimating means includes cooling temperature estimating means for estimating a temperature falling amount in the thickness direction of the steel product by a correctional device.

21. The heat treatment apparatus according to claim 13, wherein the computing device further includes heating history managing means for imaginarily dividing into a plurality of sections in the longitudinal direction of the steel product, and for managing the history, in unit of the section, of the heating electric power used for the heating of the steel product and the temperature detected value of the steel product.

22. The heat treatment apparatus according to claim 21 comprising:

target temperature calculating means for calculating heating target temperatures for each induction heating device with respect to the head portion and the back end portion of the steel product on the basis of a temperature of the head portion and a temperature of the back end portion of the steel product which were detected by the temperature detector provided at the entrance side of the induction heating device at the first stage, and the conveying speed of the steel product;

electric power supplying means for calculating electric power supplied to each induction heating device on the basis of the heating target temperatures at the head portion and the back end portion of the steel product, and for controlling the electric power in accordance with the movements of the head portion and the back end portion of the steel product and supplying it to the power supply unit;

intermediate portion target temperature calculating means, at the intermediate portion sandwiched by the head portion and the back end portion of the steel product, on the basis of an actually measured temperature at the head portion of the steel product, an actually measured temperature at the back end portion, and an actually measured temperature at the intermediate portion, for correcting the heating target temperatures for each induction heating device at the head portion and the back end portion of the steel product, and for calculating the heating target temperatures for each induction heating device at the intermediate portion; and intermediate electric power controlling means for calculating intermediate electric power supplied to each induction heating device on the basis of the heating target temperature of each induction heating device at the intermediate portion, and for controlling the intermediate electric power in accordance with the movement of the intermediate portion of the steel product and supplying it to the power supply unit.

23. The heat treatment apparatus according to claim 13 which includes the temperature detectors before and behind at least one of the induction heating devices, wherein the computing device includes:

heating efficiency estimating means for estimating a heating efficiency of the induction heating devices on the basis of the electric power supplied to the induction heating devices and the rose temperature of the steel product which was measured by the temperature detector; and correction computing means for correction-computing the electric power determined with respect to the steel product for which a heat treatment is planned next time by using the heating efficiency.

24. The heat treatment apparatus according to claim 13, wherein the computing device includes:

temperature falling amount correcting means for correcting the radiated heat amount to the atmosphere from the steel product on the rolling line by an actual measured temperature; and cooling correction electric power computing means for computing supply predetermined electric power for heating the steel product to a target temperature on the basis of the temperature falling amount estimated by the corrected radiated heat amount, with respect to the steel product for which a heat treatment is planned next time.

25. The heat treatment apparatus according to claim 13, wherein the computing device includes:

temperature falling amount correcting means for correcting the temperature falling amount by the correctional device of the steel product on the rolling line, by the actual measured temperature measured by the temperature detectors disposed before and behind the correctional device; and cooling correction electric power computing means for computing supply predetermined electric power for heating the steel product to a target temperature on the basis of the corrected temperature falling amount at the correctional device, with respect to the steel product for which a heat treatment is planned next time.

26. The heat treatment apparatus according to claim 13 which includes at least one of the temperature detectors between the induction heating devices, further comprising:

feedback control means for controlling electric power which is supplied to the induction heating device at the previous stage on the basis of a difference between the steel product temperature measured by the temperature detector and the target temperature at the position which was provided in advance; and feedforward control means for controlling electric power which is supplied to the induction heating device at the rear stage on the basis of a difference between the steel product temperature measured by the temperature detector and the target temperature at the position which was provided in advance.

27. The heat treatment apparatus according to claim 26, wherein the feedback control means controls electric power supplied to the induction heating device at the previous stage on the basis of a difference between the steel product temperature measured by the temperature detector and the target temperature at the position which is provided in advance, in units of the plurality of sections which were imaginarily divided in the longitudinal direction of the steel product.

28. The heat treatment apparatus according to claim 26, wherein the feedforward control means controls heating electric power supplied to the induction heating device at the rear stage on the basis of a difference between the steel product temperature measured by the temperature detector and the target temperature at the position which is provided in advance, in units of the plurality of sections which were imaginarily divided in the longitudinal direction of the steel product.

29. A heat treatment apparatus comprising:

a plurality of induction heating devices which are disposed on a rolling line of a steel product, and which are arranged at the rear stage of an accelerated cooling device swiftly cooling the rolled steel product;

a correctional device which corrects correcting the steel product;

at least one temperature detector which is disposed on the rolling line and which detects a temperature of the steel product;

a first computing device which computes first supply predetermined electric power which is supplied to the induction heating devices, on the basis of a size of the steel product, a conveying speed of the steel product, a heating target temperature of the steel product, and a predetermined temperature of the steel product at the previous stage of the induction heating devices;

a second computing device which computes second supply predetermined electric power which is supplied to the induction heating devices, on the basis of the size of the steel product, a conveying speed of the steel product, a heating target temperature of the steel product, and an actually measured temperature of the steel product measured by the temperature detector at the previous stage of the induction heating devices;

an electric power selecting device which selects the first supply predetermined electric power as supply predetermined electric power when a difference between the predetermined temperature of the steel product and the actual measured temperature of the steel product is within a predetermined range, and which selects the second supply predetermined electric power as supply predetermined electric power when a difference between the predetermined temperature of the steel product and the actual measured temperature of the steel product is not within a predetermined range; and a power supply unit which supplies the supply predetermined electric power selected by the electric power selecting device to the induction heating devices, wherein the first and the second computing devices compute supply predetermined electric power to be supplied to the induction heating devices in order to heat the steel product so that the steel product has a surface temperature equal to or lower than a first target temperature while being heated, and a difference between a second target temperature and a temperature which the steel product has at a predetermined position in the thickness direction of the steel product when the heating is completed falls within a predetermined range, or so that the steel product has a surface equal to or higher than a third target temperature while being heated and has a temperature equal to or lower than a fourth target temperature at the predetermined position in the thickness direction of the steel product when the heating is completed.

30. A heat treatment method of a heat treatment apparatus which includes a plurality of induction heating devices which heat a steel product, a correctional device for correcting the steel product, a computing device which computes supply predetermined electric power which is supplied to the induction heating device, and a power supply unit which supplies the supply predetermined electric power computed by the computing devices to the induction heating device, comprising:

on the basis of a size of the steel product, a conveying speed of the steel product, heating target temperatures of the steel product, a predetermined temperature of the steel product at the previous stage of the induction heating device, a step of computing supply predetermined electric power to be supplied to the induction heating devices in order to heat the steel product so that the steel product has a surface temperature equal to or lower than a first target temperature while being heated, and a difference between a second target temperature and a temperature which the steel product has at a predetermined position in the thickness direction of the steel product when the heating is completed falls within a predetermined range; or a step of computing supply predetermined electric power to be supplied to the induction heating devices in order to heat the steel product so that the steel product has a surface equal to or higher than a third target temperature while being heated and has a temperature equal to or lower than a fourth target temperature at the predetermined position in the thickness direction of the steel product when the heating is completed.

31. The heat treatment method according to claim 30, wherein the induction heating devices are disposed on a rolling line of the steel product, and heat the steel product which was swiftly cooled by an accelerated cooling device after rolling.

32. The heat treatment method according to claim 30, wherein
the conveying speed of the steel product is a conveying speed determined in advance on the basis of the size of the steel product.

33. The heat treatment method according to claim 30 further comprising:

a temperature estimating step of estimating a surface temperature of the steel product and an internal temperature in the thickness direction after induction heating on the basis of the data including the conveying speed of the steel product and the supply predetermined electric power;

a fitting judging step of judging whether or not the surface temperature of the steel product and the internal temperature in the thickness direction are fit for predetermined temperature conditions;

a judging processing step of correcting the supply predetermined electric power when they are not fit for the temperature conditions, and of repeatedly executing the temperature estimating means and the fitting judging means; and an electric power determining step of determining the supply predetermined electric power used for the computing as electric power which is supplied to the induction heating devices when they are fit for the temperature conditions.

34. A heat treatment method of a heat treatment apparatus which includes a plurality of induction heating devices which are disposed on a rolling line of a steel product, and which are arranged at the rear stage of an accelerated cooling device swiftly cooling the rolled steel product, a correctional device which corrects the steel product, at least one temperature detector which is disposed on the rolling line and which detects a temperature of the steel product, a computing device which computes supply predetermined electric power which is supplied to the induction heating device, and a power supply unit which supplies the supply predetermined electric power computed by the computing device to the induction heating devices, comprising:

on the basis of a size of the steel product, a conveying speed of the steel product, a heating target temperature of the steel product, and an actually measured temperature of the steel product measured by the temperature detector at the previous stage of the induction heating devices, a step of computing supply predetermined electric power to be supplied to the induction heating devices in order to heat the steel product so that the steel product has a surface temperature equal to or lower than a first target temperature while being heated, and a difference between a second target temperature and a temperature which the steel product has at a predetermined position in the thickness direction of the steel product when the heating is completed falls within a predetermined range; or a step of computing supply predetermined electric power to be supplied to the induction heating devices in order to heat the steel product so that the steel product has a surface equal to or higher than a third target temperature while being heated and has a temperature equal to or lower than a fourth target temperature at the predetermined position in the thickness direction of the steel product when the heating is completed.

35. The heat treatment method according to claim 34 further comprising:

an estimating step of estimating a steel product temperature after being heated on the basis of the conveying speed and the steel product temperature which was measured by the temperature detector;

a repeating step of changing the conveying speed, and of repeatedly executing the estimating means when the estimated steel product temperature is not within a predetermined temperature range; and an electric power computing step of computing supply predetermined electric power which is supplied to the induction heating devices in order to heat the steel product to a target temperature on the basis of the conveying speed when the estimated steel product temperature is within the predetermined temperature range.

36. A heat treatment method of a heat treatment apparatus which includes a plurality of induction heating devices which are disposed on a rolling line of a steel product, and which are arranged at the rear stage of an accelerated cooling device swiftly cooling the rolled steel product, a correctional device which corrects the steel product, at least one temperature detector which is disposed on the rolling line and which detects a temperature of the steel product, a computing device which computes supply predetermined electric power which is supplied to the induction heating devices, and a power supply unit which supplies the computed supply predetermined electric power to the induction heating devices, comprising:

a supply predetermined electric power computing step of computing supply predetermined electric power to be supplied to the induction heating devices in order to heat the steel product so that the steel product has a surface temperature equal to or lower than a first target temperature while being heated, and a difference between a second target temperature and a temperature which the steel product has at a predetermined position in the thickness direction of the steel product when the heating is completed falls within a predetermined range; or a supply predetermined electric power computing step of computing supply predetermined electric power to be supplied to the induction heating devices in order to heat the steel product so that the steel product has a surface equal to or higher than a third target temperature while being heated and has a temperature equal to or lower than a fourth target temperature at the predetermined position in the thickness direction of the steel product when the heating is completed;

a step of executing the supply predetermined electric power computing step on the basis of a size of the steel product, a conveying speed of the steel product, a heating target temperature of the steel product, a predetermined temperature of the steel product at the previous stage of the induction heating devices when a difference between the predetermined temperature of the steel product and the actual measured temperature of the steel product is within a predetermined range; and a step of executing the supply predetermined electric power computing step on the basis of the size of the steel product, a conveying speed of the steel product, a heating target temperature of the steel product, and an actually measured temperature of the steel product measured by the temperature detector at the previous stage of the induction heating devices when a difference between the predetermined temperature of the steel product and the actual measured temperature of the steel product is not within a predetermined range.

37. A recording medium on which a heat treatment program is recorded, of a heat treatment apparatus which includes a plurality of induction heating devices which heat a steel product, a correctional device which corrects the steel product, a computing device which computes supply predetermined electric power which is supplied to the induction heating device, and a power supply unit which supplies the supply predetermined electric power computed by the computing device to the induction heating devices, the recording medium recording a program thereon for making a computer execute, on the basis of a size of the steel product, a conveying speed of the steel product, a heating target temperature of the steel product, a predetermined temperature of the steel product at the previous stage of the induction heating devices, a step of computing supply predetermined electric power to be supplied to the induction heating devices in order to heat the steel product so that the steel product has a surface temperature equal to or lower than a first target temperature while being heated, and a difference between a second target temperature and a temperature which the steel product has at a predetermined position in the thickness direction of the steel product when the heating is completed falls within a predetermined range; or a step of computing supply predetermined electric power to be supplied to the induction heating devices in order to heat the steel product so that the steel product has a surface equal to or higher than a third target temperature while being heated and has a temperature equal to or lower than a fourth target temperature at the predetermined position in the thickness direction of the steel product when the heating is completed.

38. The recording medium according to claim 37, wherein the induction heating devices are disposed on a rolling line of the steel product, and heat the steel product which was swiftly cooled by an accelerated cooling device after the rolling.

39. The recording medium according to claim 37, wherein the conveying speed of the steel product is a conveying speed determined in advance on the basis of the size of the steel product.

40. The recording medium according to claim 37 recording a program thereon for making a computer further execute, a temperature estimating step of estimating a surface temperature of the steel product and an internal temperature in the thickness direction after induction heating on the basis of the data including the conveying speed of the steel product and the supply predetermined electric power;

a fitting judging step of judging whether or not the surface temperature of the steel product and the internal temperature in the thickness direction are fit for predetermined temperature conditions;

a judging processing step of correcting the supply predetermined electric power when they are not fit for the temperature conditions, and of repeatedly executing the temperature estimating means and the fitting judging means; and an electric power determining step of determining the supply predetermined electric power used for the computing as electric power which is supplied to the induction heating devices when they are fit for the temperature conditions.

41. A recording medium on which a heat treatment program is recorded, of a heat treatment apparatus which includes a plurality of induction heating devices which are disposed on a rolling line of a steel product, and which are arranged at the rear stage of an accelerated cooling device swiftly cooling the rolled steel product, a correctional device which corrects the steel product, at least one temperature detector which is disposed on the rolling line and which detects a temperature of the steel product, a computing device which computes supply predetermined electric power which is supplied to the induction heating device, and a power supply unit which supplies the supply predetermined electric power computed by the computing device to the induction heating devices, the recording medium recording a program thereon for making a computer execute, on the basis of a size of the steel product, a conveying speed of the steel product, a heating target temperature of the steel product, and an actually measured temperature of the steel product measured by the temperature detector at the previous stage of the induction heating devices, a step of computing supply predetermined electric power to be supplied to the induction heating devices in order to heat the steel product so that the steel product has a surface temperature equal to or lower than a first target temperature while being heated, and a difference between a second target temperature and a temperature which the steel product has at a predetermined position in the thickness direction of the steel product when the heating is completed falls within a predetermined range; or a step of computing supply predetermined electric power to be supplied to the induction heating devices in order to heat the steel product so that the steel product has a surface equal to or higher than a third target temperature while being heated and has a temperature equal to or lower than a fourth target temperature at the predetermined position in the thickness direction of the steel product when the heating is completed.

42. The recording medium according to claim 41 further recording a program thereon for making a computer execute:

an estimating step of estimating a steel product temperature after being heated on the basis of the conveying speed and the steel product temperature which was measured by the temperature detector;

a repeating step of changing the conveying speed when the estimated steel product temperature is not within a predetermined temperature range, and for repeatedly executing the estimating means; and an electric power computing step of computing supply predetermined electric power which is supplied to the induction heating devices in order to heat the steel product to a target temperature on the basis of the conveying speed when the estimated steel product temperature is within the predetermined temperature range.

43. A recording medium on which a heat treatment program is recorded, of a heat treatment apparatus which includes a plurality of induction heating devices which are disposed on a rolling line of a steel product, and which are arranged at the rear stage of an accelerated cooling device swiftly cooling the rolled steel product, a correctional device which corrects the steel product, at least one temperature detector which is disposed on the rolling line and which detects a temperature of the steel product, a computing device which computes supply predetermined electric power which is supplied to the induction heating devices, and a power supply unit which supplies the computed supply predetermined electric power to the induction heating devices, the recording medium recording a program thereon for making a computer execute:

a supply predetermined electric power computing step of computing supply predetermined electric power to be supplied to the induction heating devices in order to heat the steel product so that the steel product has a surface temperature equal to or lower than a first target temperature while being heated, and a difference between a second target temperature and a temperature which the steel product has at a predetermined position in the thickness direction of the steel product when the heating is completed falls within a predetermined range; or a supply predetermined electric power computing step of computing supply predetermined electric power to be supplied to the induction heating devices in order to heat the steel product so that the steel product has a surface equal to or higher than a third target temperature while being heated and has a temperature equal to or lower than a fourth target temperature at the predetermined position in the thickness direction of the steel product when the heating is completed;

a step of executing the supply predetermined electric power computing step on the basis of a size of the steel product, a conveying speed of the steel product, a heating target temperature of the steel product, a predetermined temperature of the steel product at the previous stage of the induction heating devices when a difference between the predetermined temperature of the steel product and the actual measured temperature of the steel product is within a predetermined range; and a step of executing the supply predetermined electric power computing step on the basis of the size of the steel product, a conveying speed of the steel product, a heating target temperature of the steel product, and an actually measured temperature of the steel product measured by the temperature detector at the previous stage of the induction heating devices when a difference between the predetermined temperature of the steel product and the actual measured temperature of the steel product is not within a predetermined range.

44. A method for manufacturing a steel product comprising the steps of:

heating a steel slab to around 1200° C. in a heating furnace;

hot rolling the steel slab to form a steel product having a temperature of 800 to 1000° C.;

water cooling or air cooling the steel product from the hot rolling step; and heating the cooled steel product by the heat treatment method according to claim 30.

45. A method for manufacturing a steel product comprising the steps of:

heating a steel slab to around 1200° C. in a heating furnace;

hot rolling the steel slab to form a steel product having a temperature of 800 to 1000° C.;

water cooling or air cooling the steel product from the hot rolling step; and heating the cooled steel product by the heat treatment method according to claim 34.

46. A method for manufacturing a steel product comprising the steps of:

heating a steel slab to around 1200° C. in a heating furnace;

hot rolling the steel slab to form a steel product having a temperature of 800 to 1000° C.;

water cooling or air cooling the steel product from the hot rolling step; and heating the cooled steel product by the heat treatment method according to claim 36.

* * * * *